US007585218B2

(12) United States Patent
Mead et al.

(10) Patent No.: US 7,585,218 B2
(45) **Date of Patent: *Sep. 8, 2009**

(54) GAMING DEVICE HAVING MULTIPLE SELECTION GROUPS WITH RANDOMLY ALIGNING ADVANCES

(75) Inventors: Randall D. Mead, Reno, NV (US); Wing Yee Ngan, Los Angeles, CA (US)

(73) Assignee: IGT, Reno, NV (US)

( * ) Notice: Subject to any disclaimer, the term of this patent is extended or adjusted under 35 U.S.C. 154(b) by 827 days.

This patent is subject to a terminal disclaimer.

(21) Appl. No.: 10/661,036

(22) Filed: Sep. 12, 2003

(65) Prior Publication Data

US 2005/0059456 A1 Mar. 17, 2005

(51) Int. Cl.
*A63F 13/00* (2006.01)

(52) U.S. Cl. .............................. 463/20; 463/16; 463/25

(58) Field of Classification Search .................. 463/16, 463/17, 20, 25; 273/139
See application file for complete search history.

(56) References Cited

U.S. PATENT DOCUMENTS

| | | | |
|---|---|---|---|
| 1,527,929 | A | 2/1925 | Simons |
| 3,642,287 | A | 2/1972 | Lally et al. |
| 4,182,515 | A | 1/1980 | Nemeth |
| 4,448,419 | A | 5/1984 | Telnaes |
| 4,560,161 | A | 12/1985 | Hamano |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,775,155 | A | 10/1988 | Lees |
| 4,874,173 | A | 10/1989 | Kishishita |
| 4,991,848 | A | 2/1991 | Greenwood et al. |
| 5,046,737 | A | 9/1991 | Fienberg |
| 5,116,055 | A | 5/1992 | Tracy |
| 5,152,529 | A | 10/1992 | Okada |
| 5,178,390 | A | 1/1993 | Okada |
| 5,205,555 | A | 4/1993 | Hamano |
| 5,342,047 | A | 8/1994 | Heidel et al. |
| 5,380,007 | A | 1/1995 | Travis et al. |
| 5,449,173 | A | 9/1995 | Thomas et al. |
| 5,456,465 | A | 10/1995 | Durham |
| 5,524,888 | A | 6/1996 | Heidel |
| 5,536,016 | A | 7/1996 | Thompson |

(Continued)

FOREIGN PATENT DOCUMENTS

EP 0688002 B1 12/1995

(Continued)

*Primary Examiner*—Dmitry Suhol
*Assistant Examiner*—Damon J. Pierce
(74) *Attorney, Agent, or Firm*—K&L Gates LLP

(57) ABSTRACT

A gaming device include a game having a plurality of selection groups and a final jackpot award. The game provides the player with a number of picks with which the player uses to attempt to pick selections in the groups. The number of picks in one preferred embodiment is not enough to allow the player to pick once from every group. The game requires that one advance symbol must yield another advance symbol for the player to reach a jackpot award. That is, the player has to pick an advance symbol from a first group that yields automatically an advance symbol from a second group. The player then advances through the second group without consuming a second pick to a third group or to the jackpot award.

55 Claims, 13 Drawing Sheets

U.S. PATENT DOCUMENTS 5,542,669 A 8/1996 Charron et al.
5,647,798 A 7/1997 Falciglia
5,711,525 A 1/1998 Breeding
5,743,524 A 4/1998 Nannicola
5,823,873 A 10/1998 Moody
5,833,536 A 11/1998 Davids et al.
5,855,514 A * 1/1999 Kamille ........................ 463/17
5,931,467 A * 8/1999 Kamille ...................... 273/139
5,980,384 A * 11/1999 Barrie .......................... 463/16
5,996,997 A * 12/1999 Kamille ...................... 273/139
6,015,346 A 1/2000 Bennett
6,089,976 A 7/2000 Schneider et al.
6,102,798 A 8/2000 Bennett
6,149,156 A 11/2000 Feola
6,155,925 A 12/2000 Giobbi et al.
6,159,097 A 12/2000 Gura
6,159,098 A 12/2000 Slomiany et al.
6,174,235 B1 1/2001 Walker et al.
6,176,487 B1 * 1/2001 Eklund et al. ............... 273/249
6,190,255 B1 2/2001 Thomas et al.
6,203,429 B1 3/2001 Demar et al.
6,231,442 B1 5/2001 Mayeroff
6,237,913 B1 * 5/2001 Kamille ...................... 273/139
6,254,481 B1 7/2001 Jaffe
6,261,177 B1 7/2001 Bennett
6,302,790 B1 10/2001 Brossard
6,309,300 B1 10/2001 Glavich
6,312,334 B1 11/2001 Yoseloff
6,315,660 B1 11/2001 DeMar et al.
6,315,664 B1 11/2001 Baerlocher et al.
6,319,124 B1 11/2001 Baerlocher et al.
6,322,309 B1 11/2001 Thomas et al.
6,343,988 B1 2/2002 Walker et al.
6,346,043 B1 2/2002 Colin et al.
6,347,996 B1 * 2/2002 Gilmore et al. ............... 463/17
6,364,766 B1 4/2002 Anderson et al.
6,364,767 B1 4/2002 Brossard et al.
6,368,218 B2 4/2002 Angell, Jr.
6,375,187 B1 4/2002 Baerlocher et al.
6,398,644 B1 6/2002 Perrie et al.
6,439,985 B2 8/2002 Rogers et al.
6,439,995 B1 * 8/2002 Hughs-Baird et al. ......... 463/20
6,443,837 B1 * 9/2002 Jaffe et al. .................... 463/16
6,464,582 B1 10/2002 Baerlocher et al.
6,494,785 B1 12/2002 Gerrard et al.
6,506,118 B1 1/2003 Baerlocher et al.
6,511,375 B1 * 1/2003 Kaminkow .................. 463/20
6,514,141 B1 2/2003 Kaminkow et al.
6,572,472 B1 * 6/2003 Glavich ....................... 463/16
6,575,830 B2 6/2003 Baerlocher et al.
6,582,307 B2 6/2003 Webb
6,595,854 B2 * 7/2003 Hughs-Baird et al. ......... 463/20
6,599,185 B1 7/2003 Kaminkow et al.
6,602,137 B2 8/2003 Kaminkow et al.
6,607,437 B2 8/2003 Casey et al.
6,609,974 B2 8/2003 Mead et al.
6,632,141 B2 10/2003 Webb et al.
6,669,560 B2 * 12/2003 Eklund et al. ................. 463/17
6,722,983 B2 * 4/2004 Kaminkow et al. ........... 463/26
6,733,386 B2 * 5/2004 Cuddy et al. .................. 463/17
7,182,689 B2 * 2/2007 Hughs-Baird et al. ......... 463/20
7,220,180 B2 * 5/2007 Kaminkow et al. ........... 463/16
7,273,415 B2 * 9/2007 Cregan et al. ................. 463/25
2002/0010018 A1 * 1/2002 Lemay et al. ................. 463/20
2002/0045475 A1 * 4/2002 Glavich et al. ................ 463/20
2002/0072402 A1 6/2002 Baerlocher
2002/0142822 A1 10/2002 Baerlocher et al.
2002/0183109 A1 12/2002 McGahn et al.
2003/0013514 A1 * 1/2003 Cregan et al. ................. 463/20
2003/0027623 A1 2/2003 Rose
2003/0040360 A1 2/2003 Kaminkow
2003/0045349 A1 * 3/2003 Hughs-Baird ................ 463/25
2003/0078093 A1 4/2003 Simms et al.
2003/0078096 A1 4/2003 Kaminkow et al.
2003/0119583 A1 6/2003 Kaminkow et al.
2003/0157979 A1 8/2003 Cannon et al.
2003/0157982 A1 8/2003 Gerrard et al.
2003/0162578 A1 8/2003 Baerlocher et al.
2003/0162579 A1 8/2003 Gauselmann
2003/0162583 A1 * 8/2003 Baerlocher et al. ............ 463/20
2003/0162584 A1 8/2003 Hughs-Baird et al.
2003/0195027 A1 10/2003 Baerlocher et al.
2003/0195028 A1 * 10/2003 Glavich ....................... 463/16
2004/0036212 A1 * 2/2004 Walker et al. ............... 273/139
2005/0054414 A1 * 3/2005 Gauselmann ................ 463/16

FOREIGN PATENT DOCUMENTS

EP 0945837 A2 9/1999
GB 2 144 644 A 8/1983
WO WO 9732285 9/1997
WO WO 00/12186 3/2000

* cited by examiner

GAMING DEVICE HAVING MULTIPLE SELECTION GROUPS WITH RANDOMLY ALIGNING ADVANCES

CROSS-REFERENCE TO RELATED APPLICATIONS

This application relates to the following commonly owned application: "GAMING DEVICE HAVING A BONUS SCHEME WITH MULTIPLE SELECTION GROUPS," Ser. No. 09/656,702, now U.S. Pat. No. 6,439,995; "GAMING DEVICE HAVING A BONUS SCHEME WITH MULTIPLE SELECTION GROUPS," Ser. No. 10/195,292, now U.S. Pat. No. 6,595,854 B2; "GAMING DEVICE HAVING A BONUS SCHEME INCLUDING A PLURALITY OF SELECTION GROUPS WITH WIN-GROUP OUTCOMES," Ser. No. 09/981,084, now U.S. Pat. No. 6,932,701; "GAMING DEVICE HAVING A BONUS SCHEME WITH MULTIPLE SELECTION GROUPS," Ser. No. 10/243,047, now U.S. Pat. No. 7,273,415; and "GAMING DEVICE HAVING A BONUS SCHEME WITH MULTIPLE SELECTION GROUPS," Ser. No. 10/623,421, now U.S. Pat. No. 7,182, 689.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and in particular to a gaming device having a game, such as a base or bonus game, with multiple selection groups that increase player excitement and enjoyment.

Gaming machines currently exist with bonus schemes in which the player has one or more opportunities to choose a particular selection or symbol from a group of symbols. When a player chooses a symbol, existing games will either award the player a bonus value or terminate the bonus round. The outcome depends upon the particular symbol selected by the player.

In one existing game, when the player selects a masked symbol that awards a bonus value, the player receives the value and is provided with another chance to select another masked symbol. Each time the player selects an award symbol, the game provides the associated award and prompts the player to make another selection. The player then selects another symbol and the process continues until the player selects a symbol that terminates the bonus round. When the player selects a masked end-bonus symbol, the game displays a message such as "COLLECT". That message indicates that the bonus round has terminated, and the player collects any accrued values.

In the above type of game, the gaming device is programmed so that in each bonus round a certain number of symbols yield awards and a certain number of symbols end the game. The player selects value-associated outcomes from a finite number of selections until selecting an "end-bonus" outcome. While that game offers advantages in player appeal and excitement, there is a continuing need to develop new types of bonus games, which further enhance the level of player interaction, excitement and enjoyment.

U.S. Pat. No. 6,439,995, assigned to the assignee of the present invention, discloses a game ('the '995 game") having multiple selection groups, wherein the player advances from one group to the next group when the player selects an advance symbol. That is, the player picks selections from a group until reaching an advance. In this game, the player wants to delay the pick of the advances as much as possible to collect as many awards in the group as possible before receiving the advance. Unlike the first game, however, when the player picks the advance in '995 game the player proceeds to another selection group rather than to an end game outcome. While the '995 game is entertaining for players, a need exists to develop new pick-until type games with multiple selection groups.

SUMMARY OF THE INVENTION

The present invention provides a game of a wagering gaming device that can be implemented as a base or primary game or as a bonus or secondary game triggered by the base or primary game. The game includes a plurality of selection groups and an advance award or a final jackpot award. The game provides the player with a designated number of picks with which the player uses to attempt to complete the selection groups to win the advance award or jackpot award. The number of picks in one embodiment is not enough to allow the player to pick: (i) once or (ii) more than once from every group. The game requires that a first advance or advance symbol be picked that yields or is aligned with or results in another advance or advance symbol from a selection of a subsequent group for the player to reach the advance award or jackpot. That is, the player has to pick an advance symbol from a first group that yields automatically an advance or advance symbol from a second group, which does not consume an additional one of the player's picks in that subsequent group. The dual advances enable the player to proceed through the second group (without consuming a second pick) to a third group or to the advance award or jackpot.

The present invention is played in one embodiment on a video monitor that operates in conjunction with a touch screen. The video monitor provides a screen that displays a number or plurality of selection groups. Those selection groups each contain a number or plurality of selections. The player picks one of the selections by touching the area displaying the desired selection. The touch screen senses the player's touch and sends a discrete output to the processor, which controls the gaming device, and which proceeds with the game according to the player's selection.

The gaming device is operable with any number of selection groups greater than or equal to two. In one embodiment, the gaming device provides three selection groups. Each selection is in one embodiment related to a selection in an adjacent (e.g., subsequent) group. In one embodiment illustrated below, the selection groups are aligned in rows and columns. The rows delineate the groups and linking between the various selections. The columns create the connection or relationships between selections of different groups. That is, each selection is related to the selection in the like column of the adjacent (previous or subsequent) group or row.

Using the example where three selection groups are provided, the gaming device in one embodiment provides the player with three picks. In one embodiment, the player can use all three picks in the selection groups and still win an advance award or jackpot at the end by advancing through all three groups. In one alternative embodiment, one of those picks is required to collect an advance award or jackpot, leaving the player with two picks to advance through each of the three groups.

In one embodiment, if the player is fortunate enough to only select advance symbols, the player reaches an advance award or jackpot award. However, if the player picks even one non-advance symbol, the game then requires the player to pick at least one advance symbol that is related to another selection in an adjacent group that also yields an advance symbol. When that happens, the game advances the player through the second group without consuming a player pick and makes-up for the player's picks of the non-advance symbol. When two advances are aligned in the same column of separate groups of selections, and the player selects one of the advances, the second aligned advance is also revealed because it resides in the same column (i.e., it is associated with a related or linked selection).

Upon selecting aligned or related advances, the player advances from the first group, through the second group, to the third group. If the selection in the third group that is related to or aligned with the advance symbol in the second group is likewise an advance symbol, the player advances through each of the three groups to the jackpot. It is therefore possible for the player to reach the advance award or jackpot after only one pick. Such a scenario requires that one column randomly draw all advances, and that the player picks that column. It is therefore contemplated to provide the player alternatively with only a single pick or two picks (and perhaps stack the selection groups with more advances) and still provide the player with an opportunity to reach the advance award or jackpot.

In one embodiment, it is more likely that two advances will be aligned, wherein the player has to use the second pick to find the advance in the third group. Or, the player needs two picks to advance to the second selection group and upon the third pick achieves two advances in a row to receive the jackpot.

In one embodiment, the player simply needs to reach the advance award or jackpot award to win it. In another embodiment, the player needs one pick at the end for the advance award or jackpot award. For example, a group of advance awards or jackpot awards could be provided, wherein the player wins one or a number of the advance awards or jackpot awards based on the number of player picks remaining. If the player needs one pick at the end, the provided number of picks can be adjusted accordingly.

When the player selects an advance and the related symbol in the adjacent group is not an advance, the gaming device operates in alternative ways. In one alternative embodiment, the gaming device automatically reveals the related symbol regardless of whether the symbol is an advance symbol or not. For example, if the related symbol is an award symbol, the gaming device reveals that award symbol and provides the associated award to the player. The player not only receives that award, but the gaming device eliminates that selection from its associated group, increasing the player's odds of picking a selection that yields an advance. In an alternative embodiment, when the adjacent related selection does not reveal an advance or advance symbol, the gaming device does not provide the award associated with the related symbol. Further, the gaming device does not reveal that symbol. In such a case, a new player who has not yet learned that because the symbol is not revealed, the symbol is not an advance symbol, may be apt to select that related symbol.

The awards associated with the symbols of the different selection groups are selected randomly, e.g., from weighted or non-weighted tables in one embodiment. Alternatively, the values are preset and consistent from game to game. The advance award or jackpot award can be likewise determined randomly or preset. If preset, the advance award or jackpot can be advertised by the gaming device.

In one embodiment, the awards increase in value as the player proceeds through the selection groups. In that manner, it is advantageous to select as many advances as possible even if the player is unable to reach the advance award or jackpot award. That is, it is advantageous for the player to use as many picks as possible in one embodiment in a subsequent selection group rather than in a prior selection group.

In one embodiment, each of the selections yields an award for the player, regardless of whether the selection also yields an advance. Further, in one embodiment, the earlier selection groups have a higher percentage of advances than do later selection groups. It is therefore more difficult to receive randomly an advance in a later selection group.

As stated above, a single advance award or jackpot award is provided in one embodiment. In other embodiments, a selection group containing a single advance award or jackpot award is provided. Further alternatively, a selection group containing a plurality of advance awards or jackpot awards are provided. In those latter embodiments, the player uses one or more final picks in hopes of achieving one or more advance awards or jackpot awards or the highest possible advance award or jackpot award.

The present invention also contemplates a number of other alternative embodiments. In one alternative embodiment, the player receives an additional award, e.g., a multiplier when the player advances through a selection group without picking from that selection group. That is, when the player receives a second advance in a second group as a result of picking a first advance in a first group, so that the player never picks from the second group, the player receives an extra bonus. The gaming device compensates for that loss of opportunity to pick from the second group by providing an extra bonus award, such as a multiplier. If the player skips through two groups, the gaming device can provide two multipliers or a higher valued multiplier.

In an additional alternative embodiment, the gaming device provides an extra bonus award in exchange for any picks that the player has remaining after receiving the jackpot award. For example, if the gaming device provides three total picks but the player only uses two picks to win the advance award or jackpot, the gaming device can award the player an extra credit or multiplier amount. If the player has two picks remaining, the player receives two additional awards, e.g., two multipliers or receives one additional larger award or multiplier.

While the gaming device is described as providing the player with an overall number of picks to be used for all selection groups, the picks can alternatively be distributed on a per group or level basis, such as one or two picks per group. The number of picks can vary from group to group, e.g., decrease as the player advances through the groups. In this "resetting" embodiment, the picks for each group can be predetermined or randomly determined.

It is therefore an advantage of the present invention to provide a game with selection groups with alignable advances.

It is another advantage of the present invention to provide a game with a relatively high value advance or jackpot award.

It is a further advantage of the present invention to provide a wagering game that is fun and exciting to play.

Additional features and advantages of the present invention are described in, and will be apparent from, the following Detailed Description of the Invention and the figures.

DETAILED DESCRIPTION OF THE INVENTION

Gaming Device and Electronics

Figure 1A:
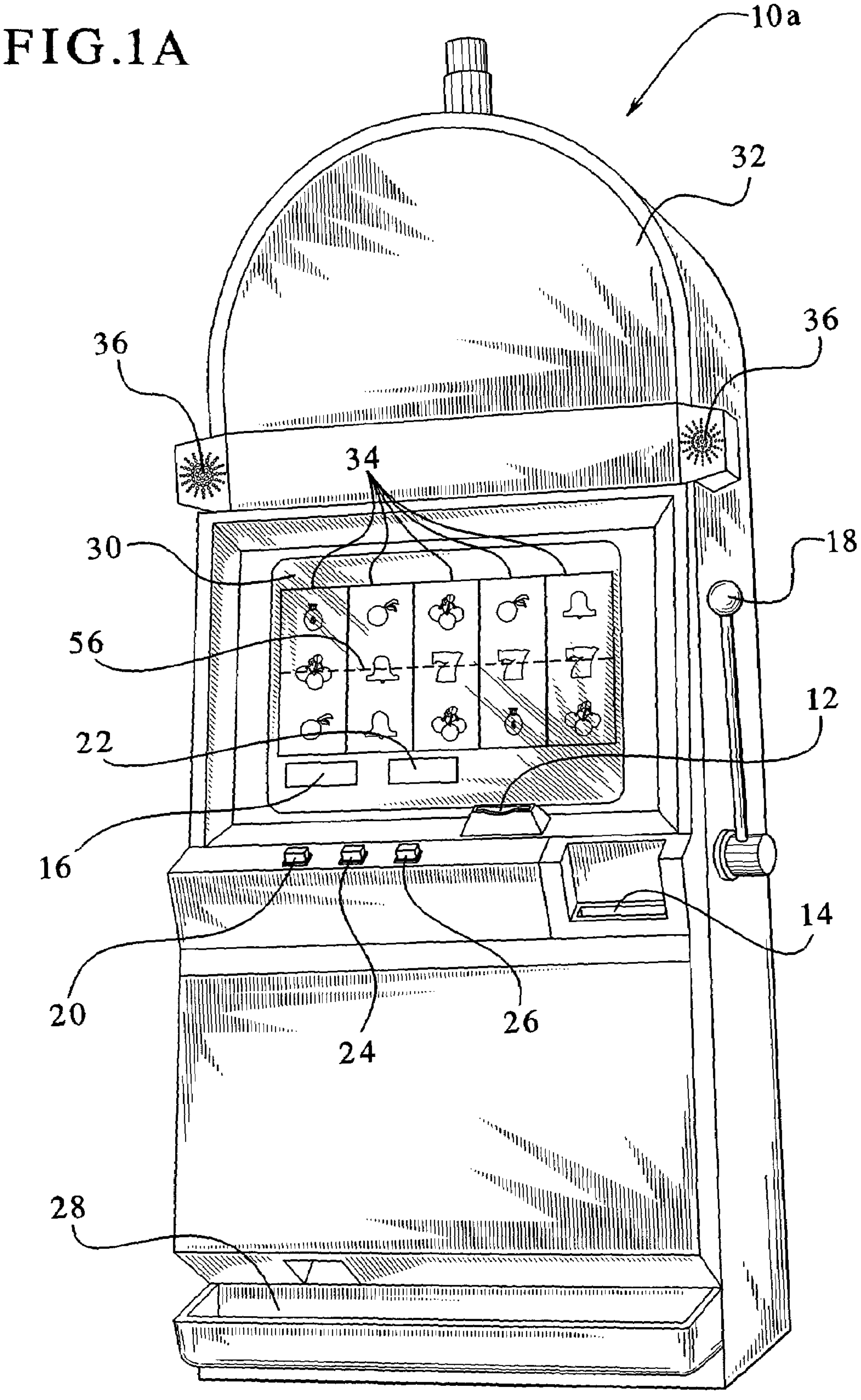
FIG. 1A is a front perspective view of one embodiment of the gaming device of the present invention.
Figure 1B:
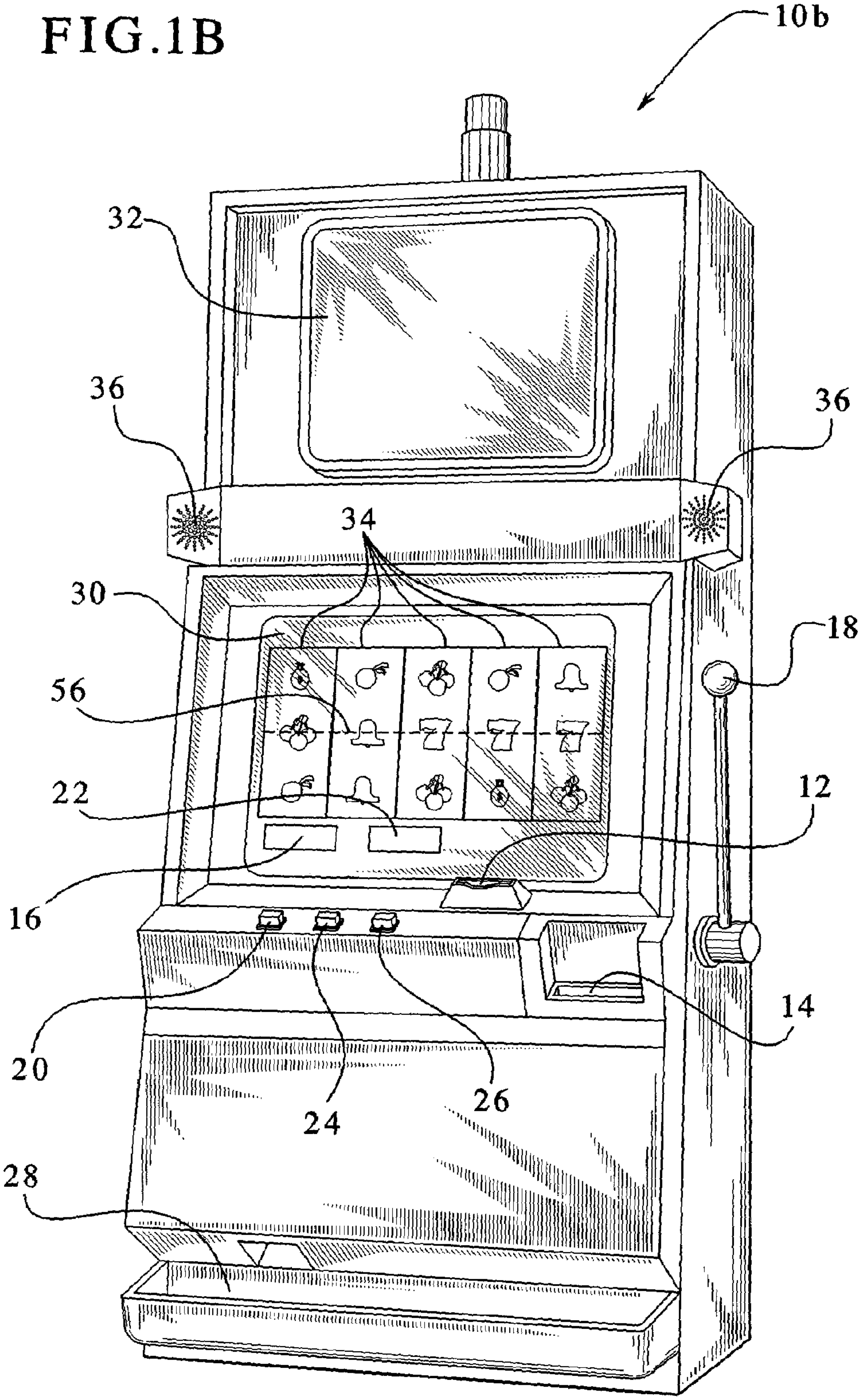
FIG. 1B is a front perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more displays. The embodiment shown in FIG. 1A includes a central display 30, and the alternative embodiment shown in FIG. 1B includes a central display 30 as well as an upper display 32. The displays display any visual representation or exhibition, including but not limited to movement of physical objects such as mechanical reels and wheels, dynamic lighting and video images. The display includes any viewing surface such as glass, a video monitor or screen, a liquid crystal display or any other static or dynamic display mechanism. In a video poker, blackjack or other card gaming machine embodiment, the display includes displaying one or more cards. In a keno embodiment, the display includes displaying numbers.

The slot machine base game of gaming device 10 displays a plurality of reels 34, preferably three to five reels 34, in mechanical or video form on one or more of the displays. Each reel 34 displays a plurality of indicia such as bells, hearts, fruits, numbers, letters, bars or other images which preferably correspond to a theme associated with the gaming device 10. If the reels 34 are in video form, the display displaying the video reels 34 is a video monitor. Each base game, especially in the slot machine base game of gaming device 10, includes speakers 36 for making sounds or playing music.

Figure 2:
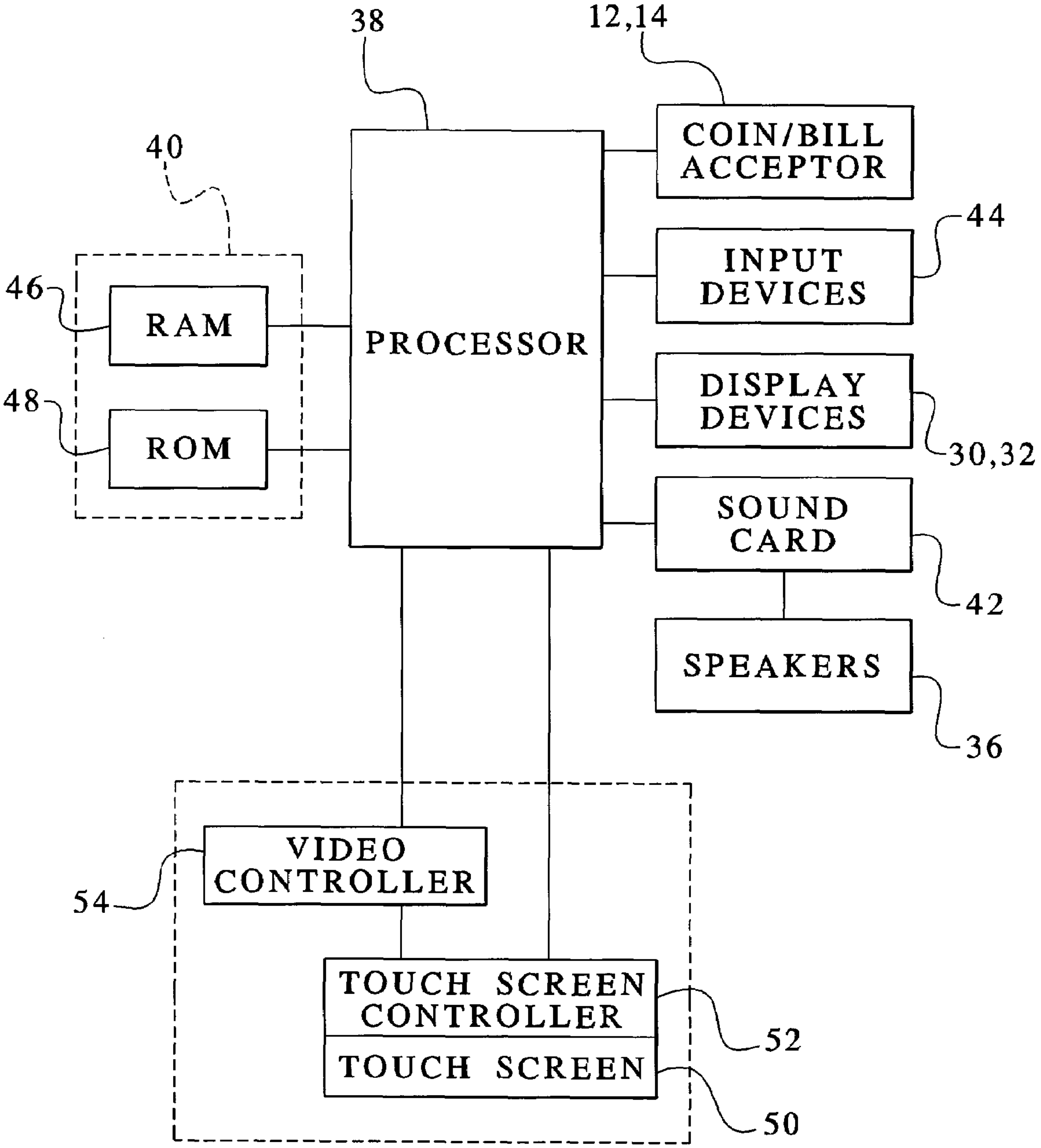
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display 30; an upper display 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display 30 or 32 for the bonus games. The bonus games include a program that automatically begins when the player achieves a qualifying condition in the base game.

In the slot machine embodiment, the qualifying condition includes a particular symbol or symbol combination generated on a display. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display the necessary number of times.

Game Play

Figure 3:
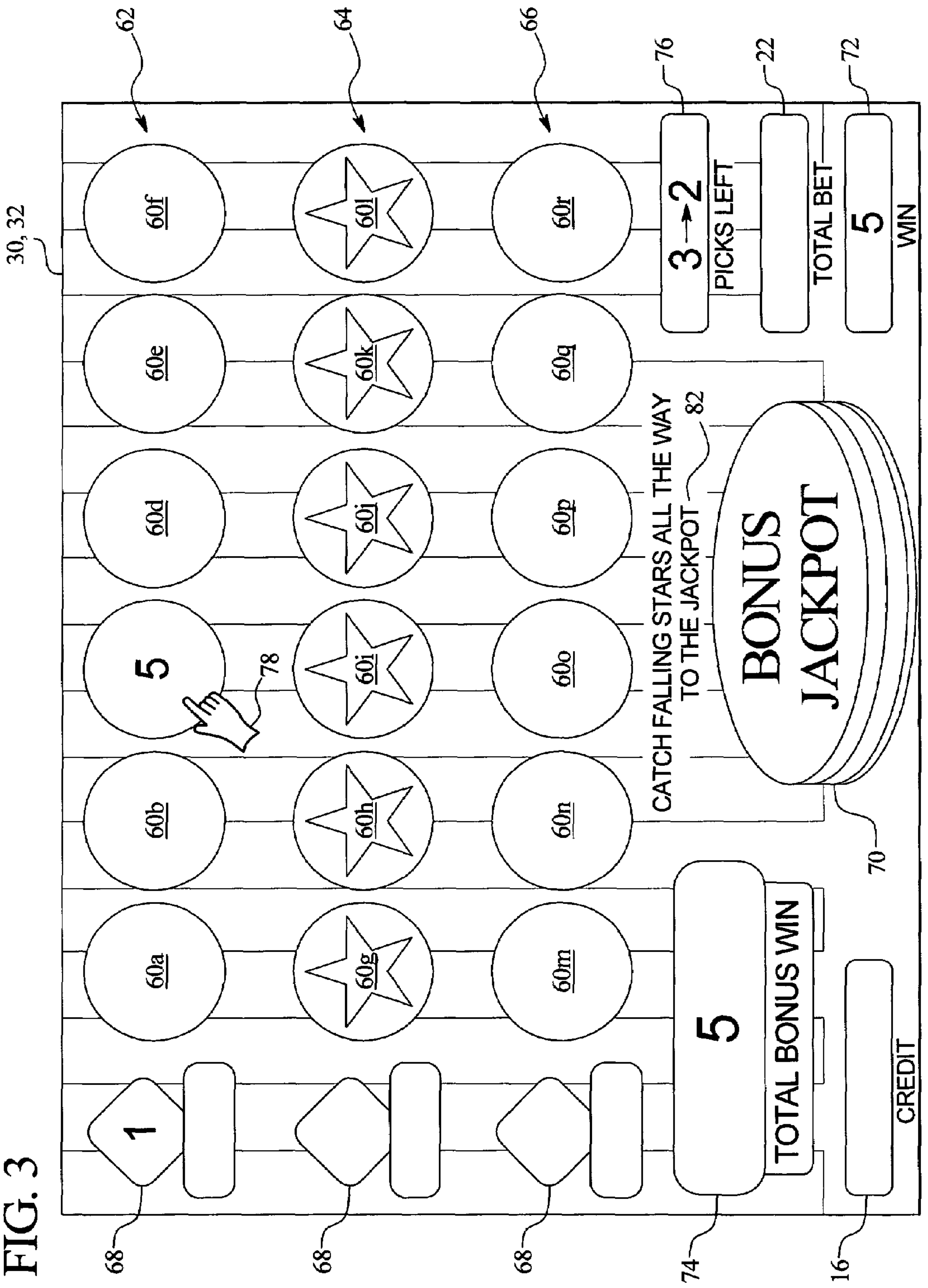
FIG. 3 is an elevation view of a first screen of one embodiment of the multiple selection group game of the present invention.
Figure 4:
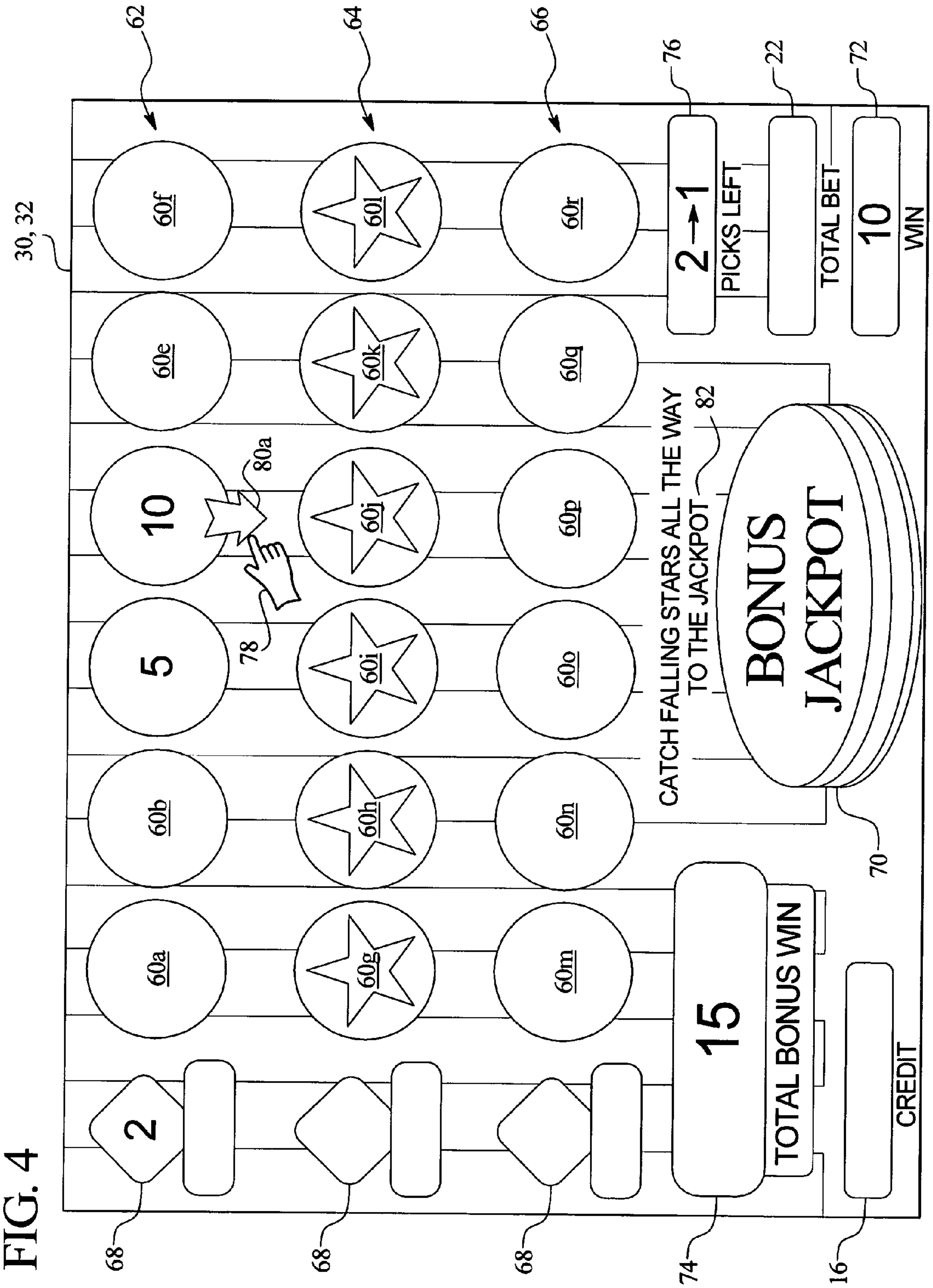
FIG. 4 is a second screen of the multiple selection group shown in FIG. 3.
Figure 5:
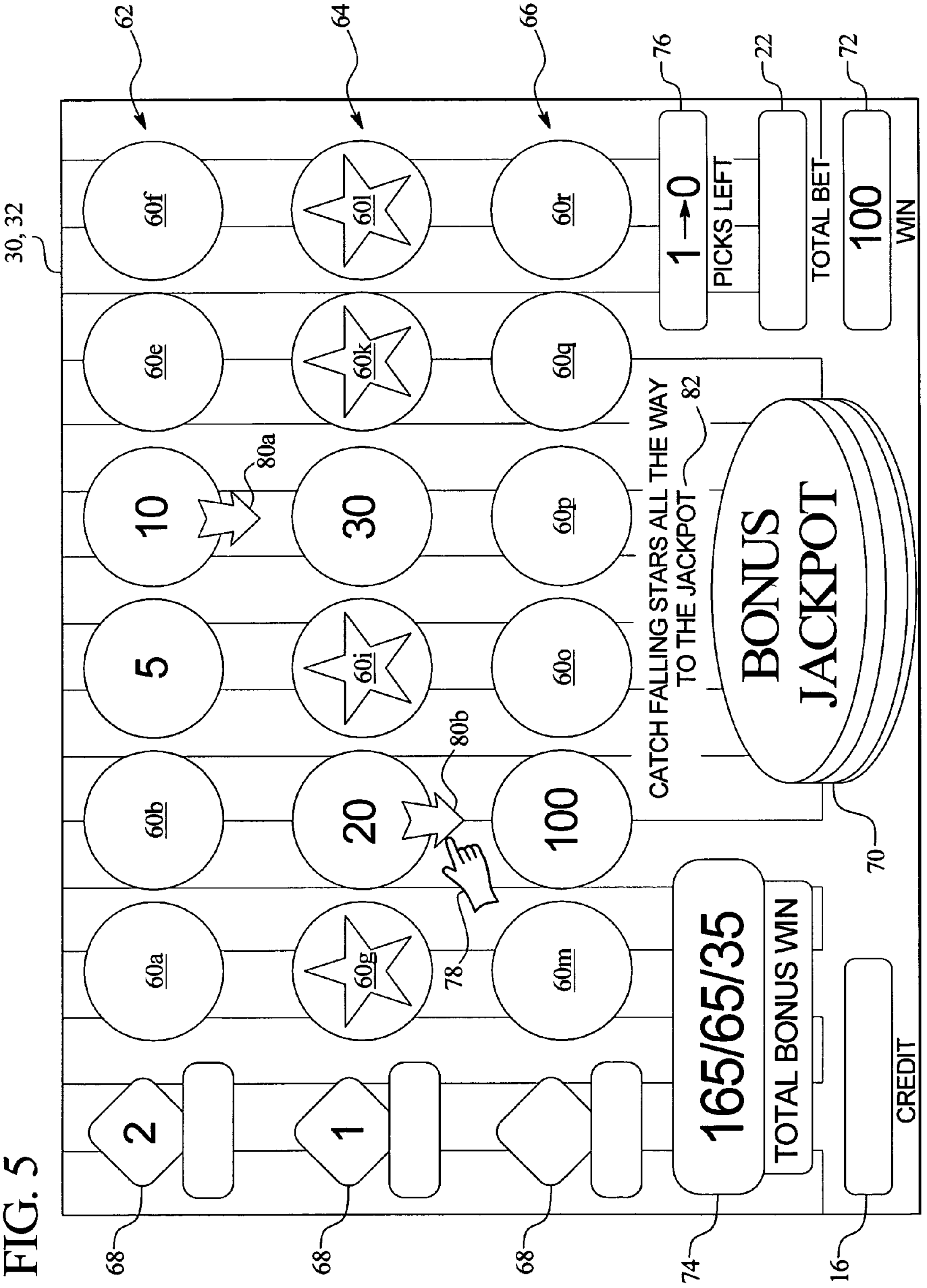
FIG. 5 is a third screen of the multiple selection group game shown in FIG. 3.

Referring now to FIGS. 3 to 5, one example of the multiple selection group game of the present invention is illustrated. FIGS. 3 to 5 are each screen shots of one of the display devices 30 or 32 described above in connection with gaming devices 10*a* and 10*b* of FIGS. 1A and 1B. Each of FIGS. 3 to 5 shows a different point in time of game play of one embodiment of the present invention. The game includes three groups of selections 62, 64 and 66. The group 62 includes selections 60*a* to 60*f*. The group 64 includes selections 60*g* to 60*l*. The group 66 includes selections 60*m* through 60*r*. In one embodiment, the selections are each areas of the video monitors 30 or 32 associated with a touch screen 50. When the player touches one of those areas, the processor 38 receives a discrete input from the touch screen 50, which signals that the player has picked a particular selection. In an alternative embodiment, the gaming device provides a plurality of electro-mechanical input devices 44 that enable the player to operate the game in a similar manner as with the touch screen 50.

Each of the selection groups 62 to 66 has an associated picks meter 68. Picks meter 68 tracks the number of picks the player makes in each group 62 to 66. A jackpot award 70 is shown below the selection groups 62 to 66. In the illustration that follows, the player picks sequentially from groups 62 to 66 with the goal of reaching jackpot award 70. FIGS. 3 to 5 include a visual, audio or audiovisual message 82 to the player that the player needs to catch one or more falling stars all the way to the jackpot.

The screen shots of FIGS. 3 to 5 also show a number of displays. The bet display 22 discussed above in connection with FIGS. 1A and 1B is provided again on display device 30 or 32. The total bet display 22 for a slot machine shows the player's total wager, which includes the number of paylines wagered multiplied by the wager per payline. The display device 30 or 32 also includes a win display 72. Win display 72 shows the player's win after each pick of one of the displayed selections 60*a* to 60*r*. Display device 30 or 32 also includes a total win display 74. Total win display 74 accumulates the wins shown in win display 72. The player's credits are also shown on display device 30 or 32 via a second credit display 16. Display device 30 or 32 further displays a picks remaining display 76. The picks remaining display 76 shows the player how many remaining picks the player has.

The processor 38 operates to place award symbols and advance symbols behind each of the masked selections 60*a* to 60*r*. The generation or random generation takes place in one of a plurality of different ways. In one way, gaming device 10 randomly assigns award symbols and advances to each of the selections 60*a* to 60*r* prior to any picks by the player. In another embodiment, gaming device 10 randomly assigns award symbols and advances to an order which the player picks. That is, the actual selection 60*a* to 60*r* that the player picks is not determinable, rather, the pick itself is randomly determined to be a particular award, an advance or an award in combination with an advance symbol. In another embodiment, gaming device 10 randomly generates an outcome immediately after the player picks a selection. In any of the embodiments for randomly associating outcomes, suitable weighted probabilities can be used to determine whether the player receives an award, an advance, or an award in combination with an advance. Still further alternatively, the awards are preset and the same for at least two consecutive plays of gaming device 10. The embodiments are each transparent to the player, making the game appear to be the same.

FIG. 3 illustrates that a first pick by player 78 is the selection 60*c* from the selection group 62. Prior to that pick, gaming device 10 can provide a suitable audio, visual or audiovisual message telling the player to pick a selection from the first group 62. As illustrated, the selection 60*c* yields an award of five, but does not yield an advance symbol. The awards of the present invention can be in many different forms. In the illustrated embodiment, the award is a number of gaming device credits. Alternatively, the award includes a multiplier of gaming device credits, such as a multiplier of the player's total bet, a component of the player's bet, the player's total number of credits, a win determined elsewhere in the game or other credit value. Otherwise, the award symbol can represent a number of picks from a prize pool, a number of free game spins, a number of free games, a non-monetary award such as food or beverage or any combination thereof.

After the player picks selection 60*c*, picks meter 68 for the selection group 62 increments to show one pick has been made. The win display 72 shows the win of credits, which is totaled in display 74. The picks remaining indicator 76 in FIG. 3 is shown transitioning from three picks to two picks. That is, the player begins the game with three total picks in the illustrated embodiment. In an alternative embodiment, the player receives a number of predetermined or randomly determined picks for each group 62 to 66, which can vary from group to group, e.g., decrease in subsequent groups. This "resetting" embodiment lets the player regroup and start over upon reaching a new level. After the pick of selection 60*c*, the player has two picks remaining. Because the player has not yet picked a selection yielding an advance symbol, the player must still select from group 62. That is, if the player attempts to select from either group 64 or 66, gaming device 10 will not reveal that selection and can provide an audio, visual or audiovisual error message.

FIG. 4 illustrates that the player 78 next picks selection 60*d*. The pick of selection 60*d* reveals an award of ten and an advance symbol 80*a*. Advance symbol 80*a* points downwardly towards the related symbol 60*j* of next or adjacent selection group 64. The advance symbol 80*a* also terminates the player's picks in selection group 62. As illustrated, the pick of the advance symbol 80*a* is accompanied by an award of ten. In an alternative embodiment, the advance symbol is not accompanied by an award or is accompanied by a different type of award from selections yielding only award symbols. In an alternative embodiment, one or more extra picks can be associated with advances or with one or more other selections. In a further alternative embodiment, one or more terminators that terminate the game or which reduce the number of picks in the game can be associated with one or more selections. In one such embodiment, one or more anti-terminators or selections that add picks may be associated with one or more selections.

Returning to the illustrated game, the pick of the selection 60*d* causes a number of displays to update on display device 30 or 32. The picks meter 68 for selection group 62 increments to show the player has consumed two picks in the selection group 62. The picks remaining indicator 76 is shown transitioning from two picks remaining to one pick. Win display 72 shows that the player has won ten credits via the pick of selection 60*d*, and display 74 shows an accumulated total win of fifteen credits. FIG. 4 continues to provide message 82 informing the player that the player needs to obtain the falling star or advance symbols to receive the jackpot award 70.

Referring now to FIG. 5, one embodiment for the result of an advance is illustrated. That is, the player receives the value of the award symbol indicated by or related to the advance 80*a* and the symbol that generated the advance, e.g., the symbol 60*d* of group 62. In the illustrated embodiment, the columns of symbols, e.g., symbols 60*d*, 60*j* and 60*p* are related. Also, the advance symbol 80*a* points to or indicates symbol 60*j*. The value or award associated with symbol 60*d*, thirty credits, is therefore revealed and provided to the player. In an alternative embodiment, the advance symbol 80*a* points or indicates, e.g., randomly, to a symbol of group 64 that is provided automatically to the player. For example, gaming device 10 could randomly decide between symbols 60*i*, 60*j* and 60*k*, which are diagonally or directly adjacent to advance symbol 80*a*.

Because the value thirty associated with symbol 60*j*, revealed automatically by advance 80*a*, is not itself an advance symbol, player 78 must now pick from group 64 until picking an advance or until exhausting all picks. However, because the thirty value of symbol 60*j* is revealed and removed from possibility, the player's chances of picking an advance symbol in group 64 are increased. As illustrated, the player has to use the third of three total picks in group 64, requiring the player to "hit" or generate two advances in a row to reach jackpot award 70. As stated above, in an alternative embodiment the player's picks are reset or are replenished upon reaching the new group 64.

As seen in FIG. 5, gaming device 10 provides a suitable audio, visual or audiovisual message informing the player to now pick from selection group 64. Accordingly, player 78 picks the selection 60*h*. That selection is revealed to show that the player wins an award of twenty and also receives an advance symbol 80*b*. Picks meter 68 for the selection group 64 increments to show that one pick has been consumed in that selection group. The overall picks display 76 indicates that the player's last pick has been consumed (one pick to zero picks) and that the player does not have any remaining picks.

In the example of the game of FIGS. 3 to 5, the player is not able to obtain a jackpot award 70 at least in part because the selection 60*j* of group 64, which is related spatially to the selection 60*d* of group 62, does not yield an advance symbol and because the symbol 60*n* reveals only a credit or award value and not additionally an advance symbol. As shown in more detail below, if selection 60*j* yields an advance symbol, the player passes through group 64 automatically without consuming one of the player's picks. Instead, because selection 60*j* does not yield an advance symbol, the player is forced to use the last of the player's selections in group 64. Because that last selection 60*n* does not produce an advance symbol, the player does not receive jackpot 70.

In an alternative embodiment, gaming device 10 does not, in the above example, reveal or award the player the award associated with selection 60*j*. Here, the player could still attempt to pick selection 60*j*. In that alternative embodiment, however, gaming device 10 would reveal an advance symbol associated with selection 60*j* and provide any associated award to the player.

Various embodiments exist for when the player selects an advance on the final pick. In the illustrated embodiment, gaming device 10 does reveal the related symbol or value of the subsequent group 66, namely, the symbol associated with selection 60*n*, which in the illustrated embodiment is one hundred, as shown in win display 72, and which is in the same column as selection 60*h* and advance symbol 80*b*. The player's overall award is therefore one hundred sixty-five as illustrated in total win display 74. Alternatively, gaming device 10 does not reveal and provide the one-hundred award associated with the selection 60*n* of selection group 66. That award is not provided to the player, yielding a total win of only sixty-five or thirty-five as seen alternatively in total win display 74, depending upon whether the player also receives the thirty value associated with selection 60*j*.

In the game of FIGS. 3 to 5, if the selection 60*n* of group 66, which is related to the selection 60*h* of group 64, instead yields additionally an advance symbol, the player wins the jackpot award 70 because the player does not need an additional pick to achieve the jackpot award 70. In an alternative embodiment, such as when multiple jackpot awards 70 are provided, the player may be required to have a pick remaining to win such one or more jackpot awards. In that alternative scenario, if the player is forced to use the player's the final pick in one of the groups 62 to 66, the player cannot win jackpot award 70.

In FIGS. 3 to 5, the selections of the groups 62 to 66 are related via the spatial relationship between symbols of like columns. That is, each symbol is related to at least one other symbol of the same column. As illustrated below in FIGS. 11 to 14, the selections 60*a* to 60*r* can be related in other suitable ways. Those relationships can be predetermined or randomly determined in accordance with the present invention. Further, as discussed above, the advance symbol alternatively indicates, points to or otherwise designates the symbol of another group to reveal, wherein that pointed to, indicated or designated symbol is not necessarily a related symbol. The non-related symbol can be chosen randomly from a sub-set of the symbol's associated group or from the entire group.

Figure 6:
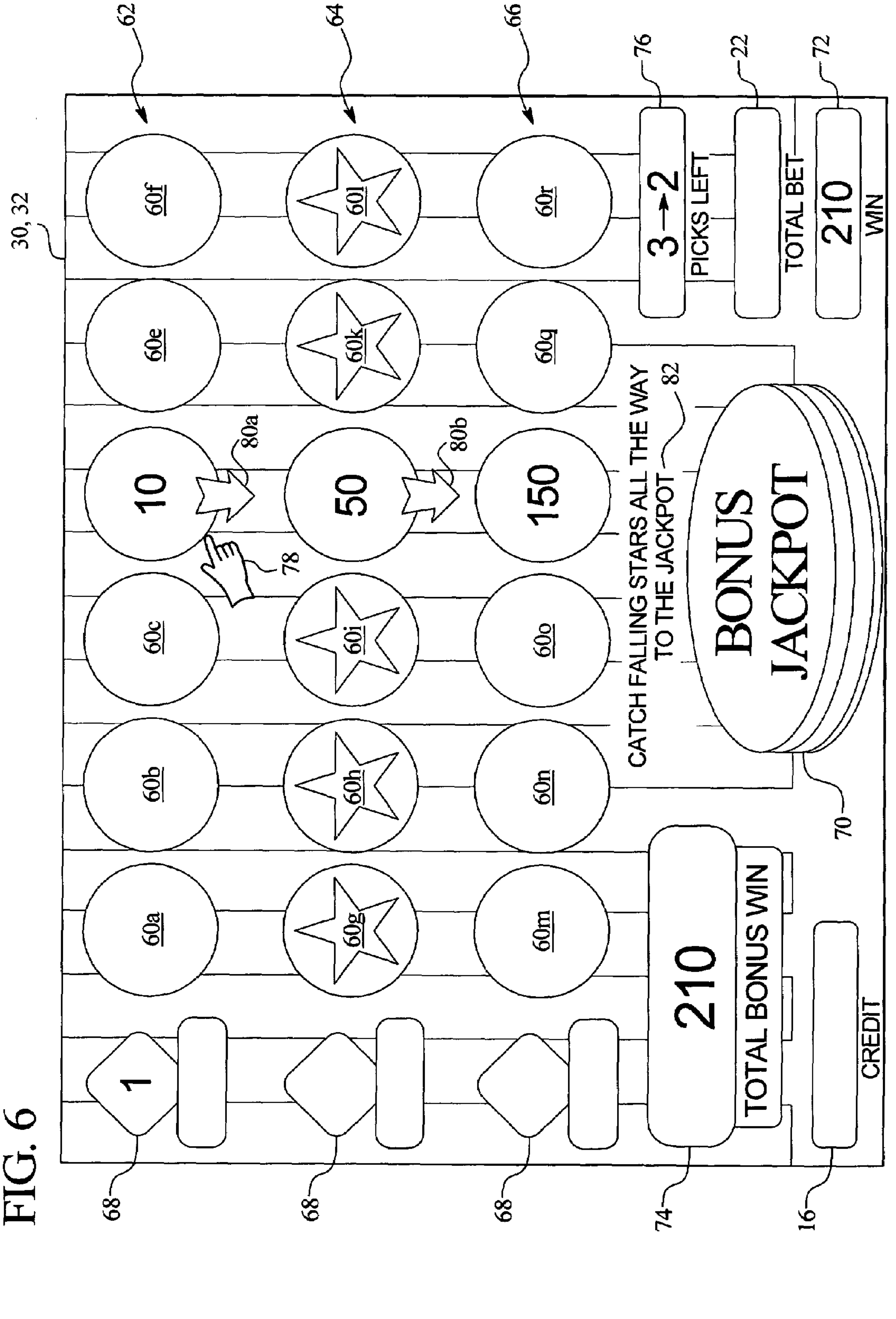
FIG. 6 is a first screen of a replay of the multiple selection group game shown in FIG. 3.
Figure 7:
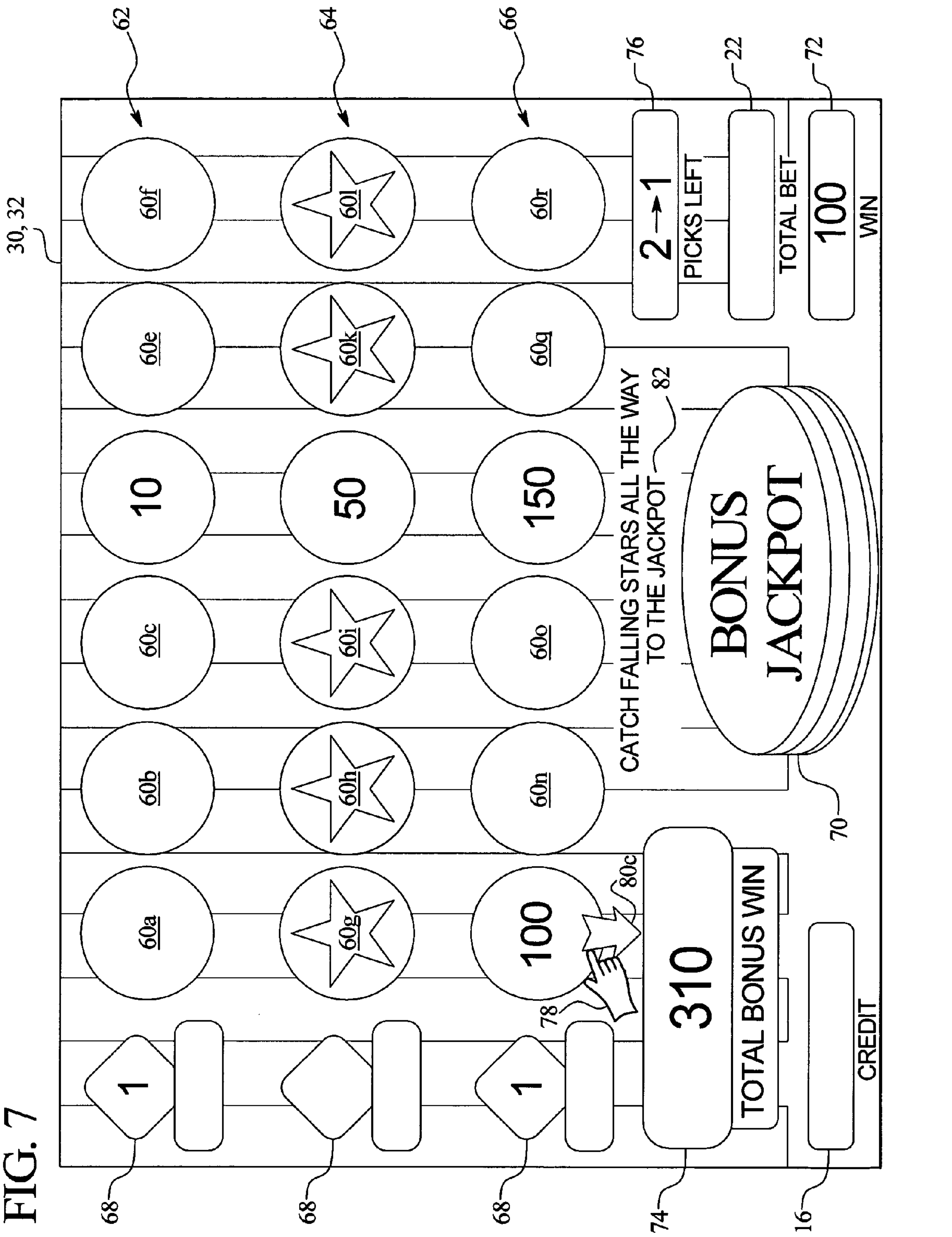
FIG. 7 is a second screen of a replay of the multiple selection group game shown in FIG. 3.
Figure 8:
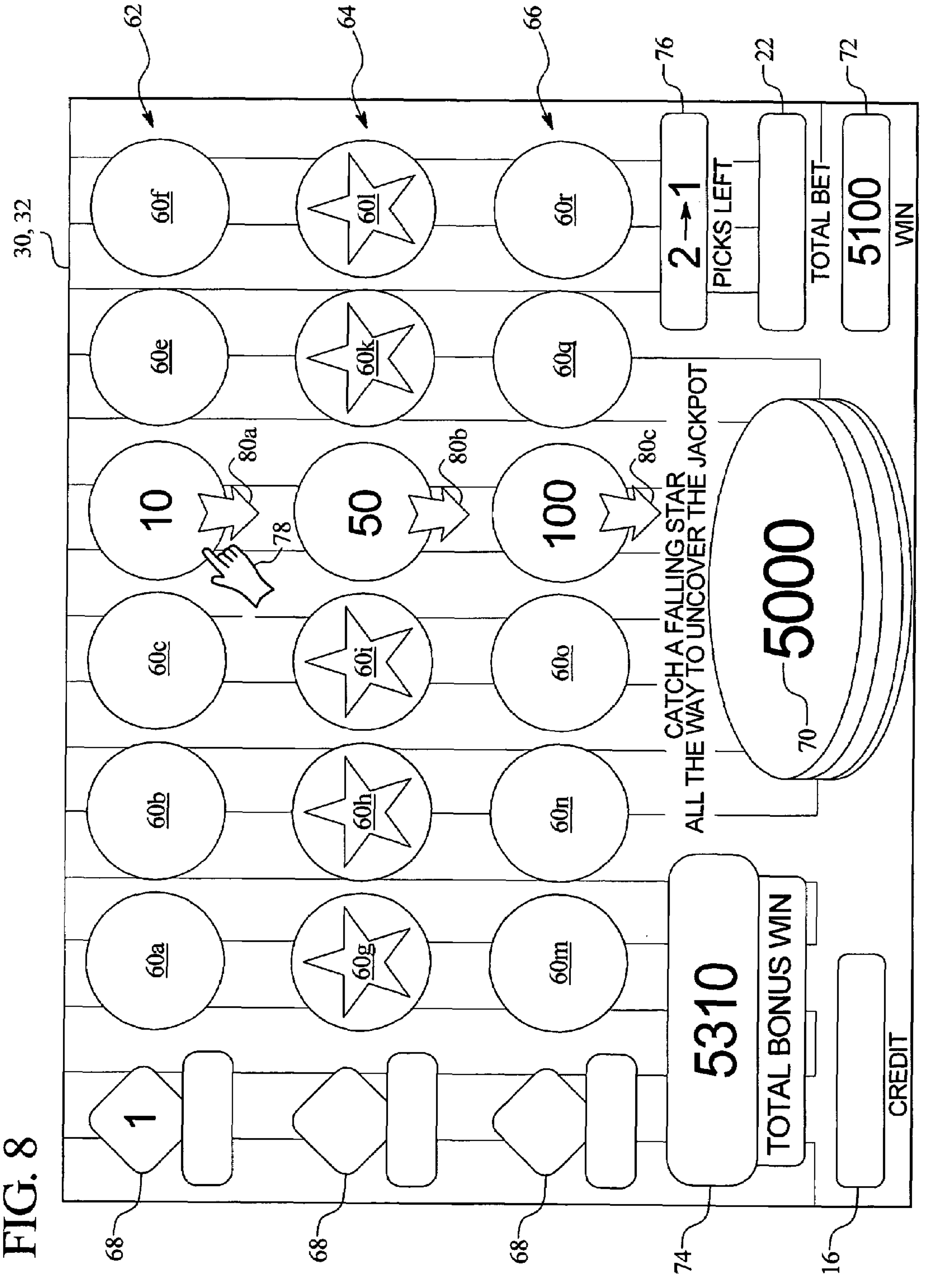
FIG. 8 is a third screen of a replay of the multiple selection group game shown in FIG. 3.

Referring now to FIGS. 6 to 8, another example of the game of the present invention is illustrated. The player wins the jackpot award in this example. FIGS. 6 to 8 include each of the components described above including the selection groups 62 to 66 having the selections 60*a* through 60*r*. Each group 62 to 66 is associated with a picks meter 68. As before, the player plays the game of FIGS. 6 to 8 hoping to navigate through groups 62 to 66 to win the jackpot 70.

In FIGS. 6 to 8, the display device 30 or 32 provides the displays described above including the credit meter 16, the total bet display 22, the win display 72, the total win display 74, and the picks remaining indicator 76. The screen shots also include message 82 informing the player that advances are needed to win the jackpot award 70. Gaming device 10 provides suitable audio, visual or audiovisual messages to the player at various times throughout the sequence shown in FIGS. 6 to 8 to guide the player and inform the player of the selection groups 62 to 66 from which the player should pick.

In FIG. 6, the player 78 picks the selection 60*d* from group 62, which yields the award of ten and the advance symbol 80*a*. Because the related symbol (or otherwise indicated or designated symbol) 60*j* of group 64 is associated with advance 80*b*, gaming device 10 reveals the award of fifty and advance 80*b* associated with selection 60*j*. The player's pick of selection 60*d* also advances the player from selection group 62, through selection group 64 and to selection group 66. The player consumes only one pick, which is shown in pick meter 68 associated with group 62. Picks remaining display 76 shows a change from three picks to two. Notably, the picks meter 68 associated with selection group 64 does not increment even though the award fifty and advance symbol 80*b* associated with selection 60*j* is revealed and provided to the player.

The win meter 72 and the total win display 74 shows that the player achieves a total win of two hundred ten credits with the single pick of selection 60*d*, which includes the combination of the award ten from selection 60*d*, the award fifty from the automatically revealed selection 60*j* and the award one hundred fifty from the automatically revealed selection 60*p* (obtained via reveal 80*b*). In the illustrated embodiment, the awards are added together. In alternative embodiments, one or more of the awards can be a multiplier, wherein the awards are multiplied. Further, in certain embodiments the player can be awarded an extra bonus, e.g., a multiplier or credit value for the group, e.g., group 64, that was passed-over by the multiple or aligned advances 80 (referring collectively to advances 80*a*, 80*b*, etc.) Further alternatively, because selection 60*p* does not yield an advance, the selection is alternatively not revealed and the player begins with a fresh group 66 of selections with none revealed.

The selection 60*p* of group 66, which is the symbol of group 66 related to selection 60*j* of group 64, is not associated with an advance symbol. As discussed above, gaming device 10 may or may not upon activating the advance 80*b* reveal and/or provide an award symbol (if one exists) associated with selection 60*p*. In the illustrated embodiment, gaming device 10 reveals and provides the award associated with selection 60*p*.

FIG. 7 illustrates that the player 78 is able to pick any of the remaining selections 60*m* to 60*o*, 60*q* and 60*r* of group 66. The player 78 picks the selection 60*m*, which yields the award of one hundred plus an advance symbol 80*c*. The picks meter 68 associated with group 66 increments to one, and the player's remaining picks shown in picks remaining display 76 decreases from two to one. The player's additional win of one hundred is shown in win meter 72 and the player's total win increases to three hundred ten as shown in win display 74.

Because the player has advanced through each of the groups 62 to 66, the player wins the jackpot award as shown in FIG. 8. FIG. 8 illustrates that the player wins the jackpot award 70, which is revealed to be a prize of five thousand. The picks remaining display 76 remains at one pick. The player's current win shown in win meter 72 is increased to 5,100, and the player's total win of five thousand three hundred ten is shown in the total win display 74. The example shown in FIGS. 6 to 8, like the example shown in FIGS. 3 to 5, does not require the player have one pick with which to select the jackpot award 70. Alternatively as shown below, the player may be required to have a pick remaining to win the jackpot, e.g., to pick one jackpot from a plurality of jackpots 70. The player in FIG. 8 has one pick left as shown in meter 76. In one alternative embodiment, gaming device 10 enables the player to receive an extra bonus or multiplier for the leftover pick.

Figure 9:
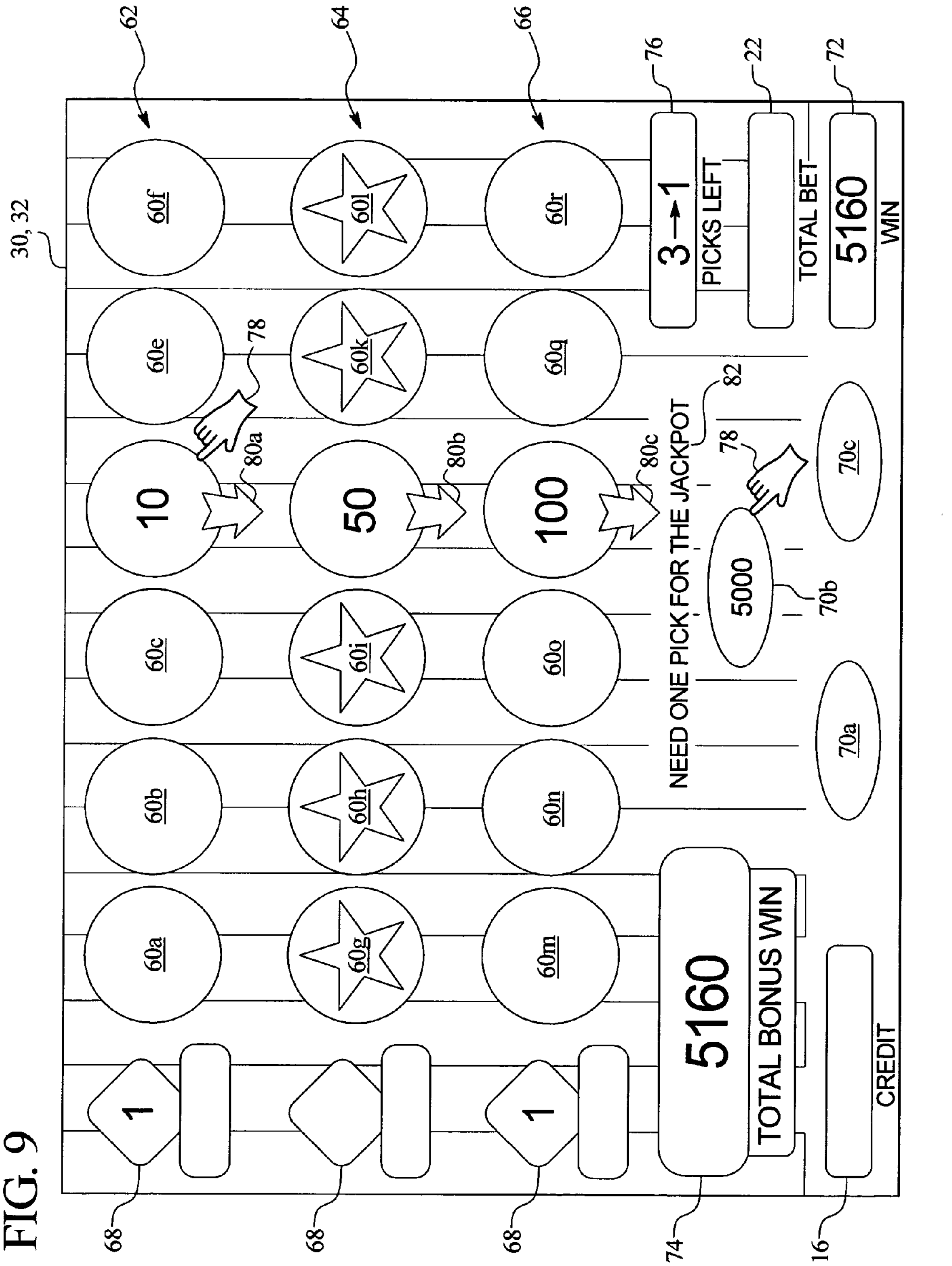
FIG. 9 is an elevation view of an alternative multiple selection group game of the present invention.

Referring now to FIG. 9, an alternative embodiment of the multiple selection group game of the present invention is illustrated. The illustrated embodiment includes each of the components described above, including the selection groups 62 to 66 and the meters or indicators, such as the picks meter 68, total bet display 22, credit display 16, win display 72 and total bonus win display 74.

In the embodiment of FIG. 9, the player does need to have a pick at the end to select one of the jackpot awards 70*a* to 70*c*. The player may therefore be provided originally with additional one or more picks with which to reach the jackpot awards 70*a* to 70*c*. If the player reaches the jackpot awards, the player needs and uses a pick to receive one of the awards. A message 84 accordingly informs the player that the player needs a pick to reach the jackpot awards 70*a* to 70*c*.

As illustrated, player 78 picks the selection 60*d* that yields the award of ten and the advance symbol 80*a*. Because the related or indicated symbol 60*j* of group 64 is associated with advance 80*b*, gaming device 10 automatically reveals and provides the award of fifty and the advance 80*b* to the player. Further, because the related or indicated selection 60*p* of group 66 is associated with the advance 80*c*, gaming device 10 reveals and provides the award of one hundred and the advance symbol 80*c* associated with selection 60*p* to the player.

As seen in FIG. 9, the player's single pick, as indicated by the picks meter 68 associated with group 62 display 76, advances the player all the way to the jackpot awards 70*a* to 70*c*. The player 78 uses the second pick to pick jackpot award 70*b* from jackpots 70*a* to 70*c*. Jackpot award 70*b* is revealed to be five thousand, wherein the player's win and total win is five thousand one hundred sixty credits as seen in both the win and total win displays 72 and 74, respectively. The player may again receive an extra bonus, e.g., a multiplier for one or both of: (i) skipping over rows 64 and 66 without a pick and (ii) having a pick left over. Alternatively, gaming device 10 enables the player to use the last pick on one of the remaining jackpots 70*a* or 70*c*. The bonus for skipping groups 64 and 66 can be increased or doubled because two rows are skipped.

Figure 10:
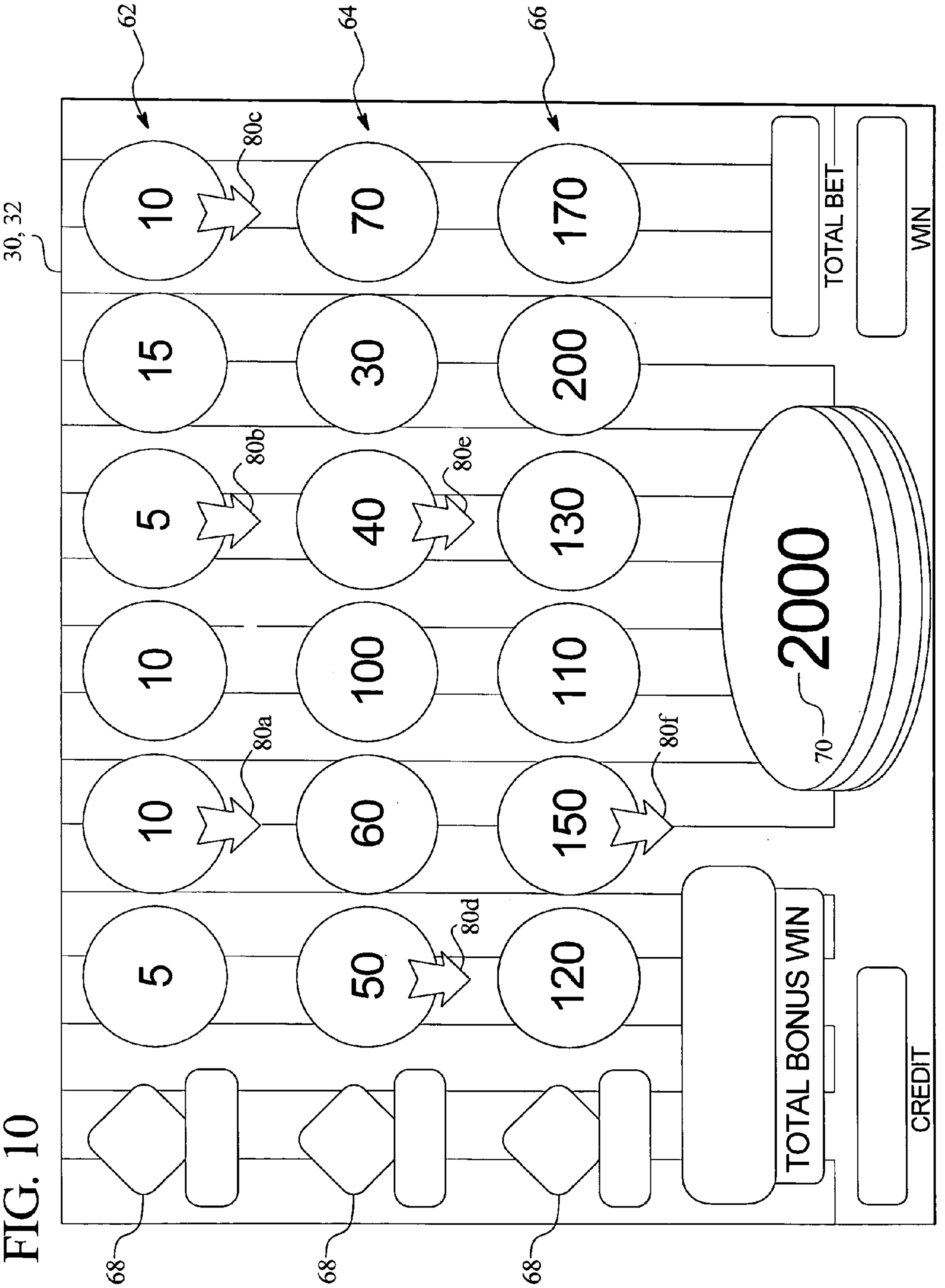
FIG. 10 is an elevation view of a screen showing all of the selections and the jackpot revealed to show the relative percentages of advances in different selection groups in one embodiment of the game of the present invention.

Referring now to FIG. 10, display device 30 or 32 illustrates each of the selections of groups 62 to 66 in a revealed form. FIG. 10 illustrates one embodiment for setting the probability of the player achieving or receiving an advance symbol in any particular selection group. In one preferred embodiment, the later the selection group, the harder it is to receive an advance symbol. Accordingly, selection group 62 includes three advance symbols 80*a* to 80*c*. Selection group 64 includes two advance symbols 80*d* and 80*e*. Final selection group 66 includes only a single advance symbol 80*f*. The percentage loading of advance symbols 80 in groups 62 to 66 can change according to a desired game mathematics and can be generated randomly from weighted or non-weighted ranges of numbers of advance symbols 80.

It should be appreciated from FIG. 10 that the player has to be fortunate in picking selections that yield advance symbols in order to win the jackpot award 70. The player may have to be fortunate enough that the game aligns or indicates at least two advance symbols in adjacent or related positions between two adjacent or related groups of selections. Again, although FIG. 10 illustrates a total of six advances, the gaming device is operable to provide any suitable random or predetermined percentage and distribution of advance symbols.

FIG. 10 also shows that the awards increase on average in advancing groups. The player, whether reading jackpot 70 or not wants to make more picks from later groups. The values are also either preset or determined randomly from weighted or non-weighted pools.

Figure 11:
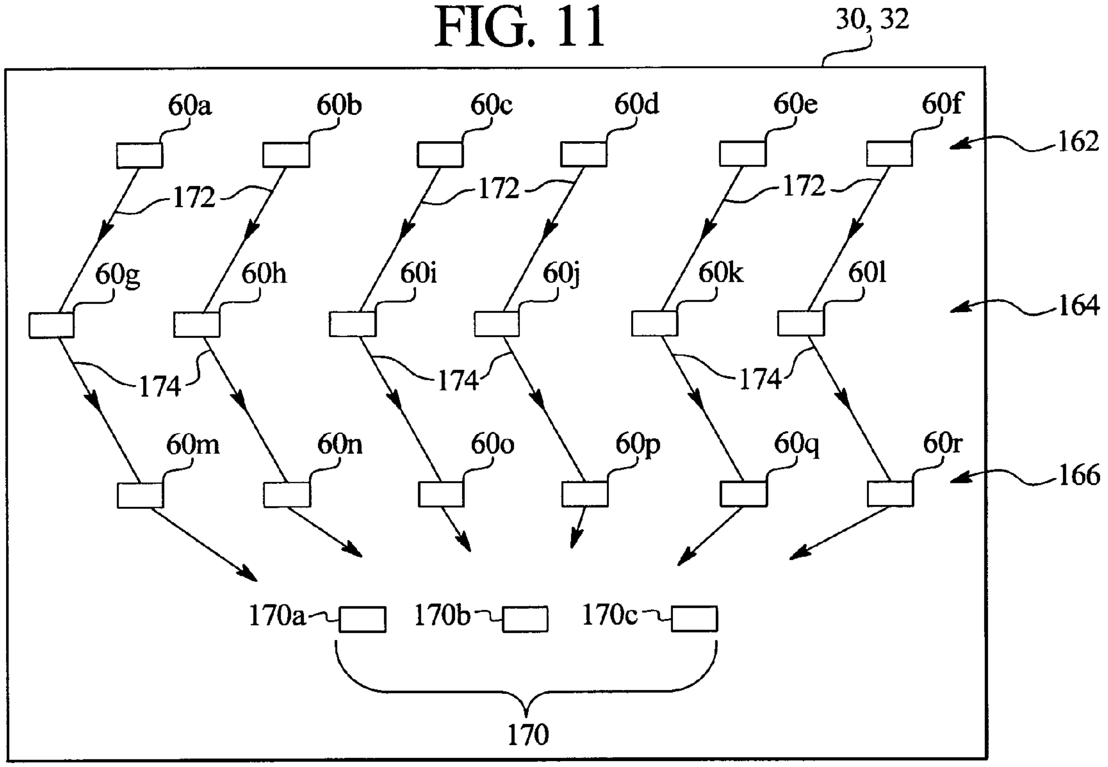
FIGS. 11, 12, 13 and 14 illustrate ways to relate selections of different selection groups that are alternative to the aligned row and column format of FIGS. 3 to 10.

Referring now to FIGS. 11 to 14, various screen displays of video monitor 30 or 32 show different embodiments for relating or associating different selections of different groups. That is, up until now, the selections have been indicated by the advance symbol 80 or related by residing in the same column as other selections of different groups, which are separated into rows. Alternatively, the groups are organized into columns, wherein the selections are related by being in the same row as the selection of another group. FIG. 11 shows a further alternative embodiment, wherein selections are related via paths 172 and 174. FIG. 11 illustrates three selection groups 162 to 166, wherein group 162 includes selections 60*a* to 60*f*. Group 164 includes selections 60*g* to 60*l*. Group 66 includes selections 60*m* to 60*r*. Each of the selections 60*a* to 60*f* is related to or linked with one of the selections 60*g* to 60*l* of group 164 via a visual link 172. Likewise, each of the selections 60*g* to 60*l* of group 164 is related or linked to one of the selections 60*m* to 60*r* of group 166 via a path or link 174.

The paths can have a variety of different shapes and lengths. It should be appreciated therefore that related symbols do not have to be aligned but can be placed anywhere on the display device 30 and 32 and be linked via a path.

FIG. 11 also shows multiple jackpots as in FIG. 9. Here, the jackpot award is set forth as a group 170 of jackpot awards 170*a* to 170*c*. Grouping the jackpot awards provides flexibility to the game designer to accomplish a number of gaming device features. The group 170 operates with the embodiment described above, wherein the player needs at least one pick at the end to achieve a jackpot award. In one embodiment, only one of or less than all of awards 170*a* to 170*c* is actually a high value award relative to the awards of the groups 162 to 166. Here, the player needs to be fortunate once again to pick the highest award. In another embodiment, each of the awards 170*a* to 170*c* is a relatively high value award, wherein the player desires to pick the highest of each of the high value awards.

As seen above, it is possible for the player to reach the jackpot award group 170 with two picks remaining. In an embodiment, gaming device 10 enables the player to use both picks to select jackpot awards. In another alternative embodiment, the gaming device does not require a player pick for the jackpot award 170 and instead generates one and only one or less than all the awards 170*a* to 170*c*.

Figure 12:
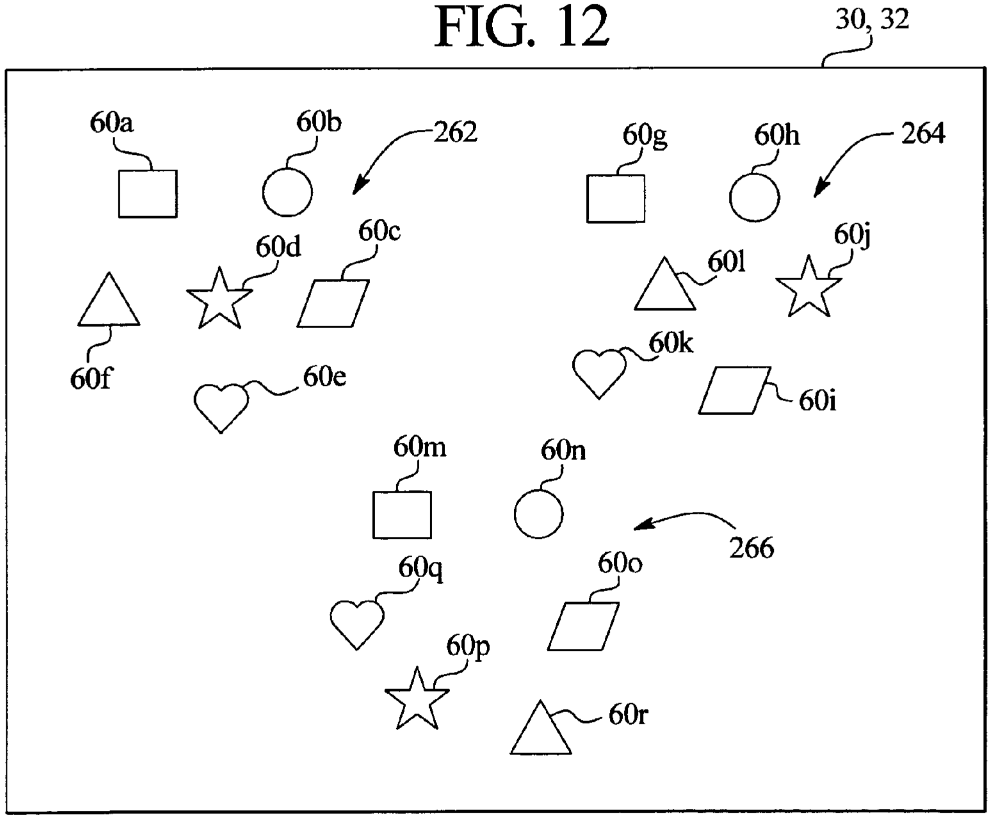

FIG. 12 illustrates a different embodiment for relating selections of different selection groups. Here, three selection groups 262, 264 and 266 are displayed. Selection group 262 includes selections 60*a* to 60*f*. Selection group 264 includes selections 60*g* to 60*l*. Selection group 266 includes selections 60*m* to 60*r*. As illustrated, the selections are related by an overall shape of a selection. That is, selection 60*a* is related to selection 60*a*, which in turn is related to selection 60*m*, each of which are rectangles. Selection 60*d* is related to selection 60*j*, which in turn is related to selection 60*p*, each of which are stars. The player makes a visual connection between selections of different groups and understands the operation of gaming device 10 of the present invention via the shapes of the selections in different groups.

Figure 13:
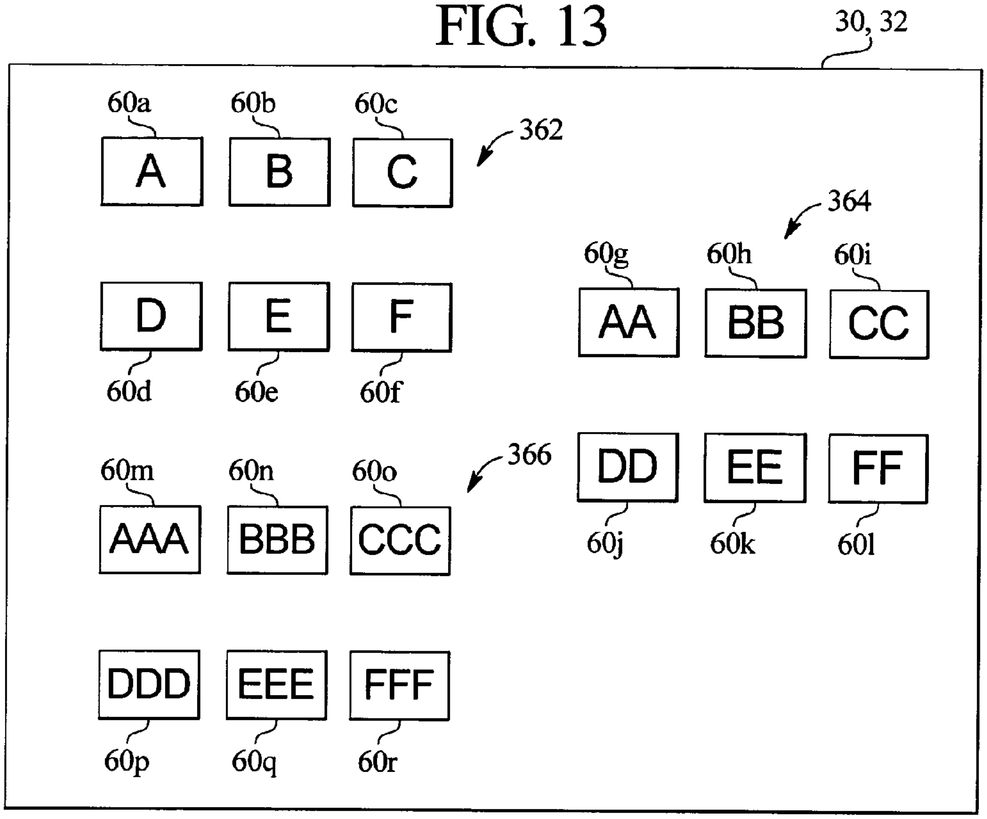

Referring now to FIG. 13, display device 30 or 32 displays three alternative selection groups 362 to 366. The groups each contain the selections 60*a* to 60*r* as described above. Here, gaming device 10 provides related but not the same indicia. Selection 60*a* is related to selection 60*g*, which in turn is related to selection 60*m*, each of which display the letter "A". Likewise, selection 60*f* is related to selection 60*l*, which in turn is related to selection 60*r*, each of which display the letter "F". Even though selection group 364 includes an additional letter with respect to group 362 and group 366 includes an additional letter with respect to group 364, the player is able to associate selections of different groups and thereby understand gaming device 10 of the present invention.

Figure 14:
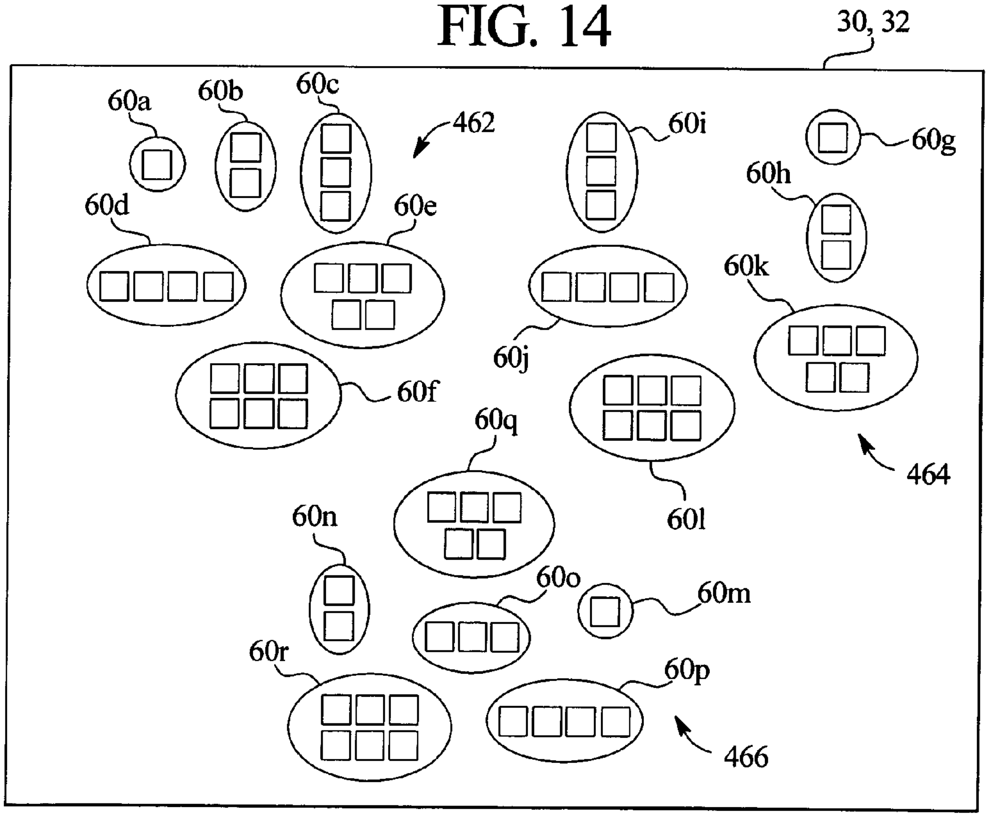

Referring now to FIG. 14, a further alternative embodiment is displayed. Here, the selections of different groups 462 to 466 are related by an amount of an item. That is, selection 60*a* is related to selection 60*g*, which in turn is related to selection 60*m*, each of which contain only one of a particular item. On the other hand, selection 60*e* is related to selection 60*k*, which in turn is related to selection 60*q*, each of which include five of a particular item.

FIGS. 12 to 14 illustrate certain examples of a myriad of ways to relate or associate selections of different groups with one another. Other ways include symbols or indicia, such as selections related by color, selections related by hatching, selections by size or image or via any combination of the above-described embodiments.

In a further alternative embodiment, gaming device 10 does not visually link related selections from different groups. Instead, gaming device 10 selects randomly a selection from the next group when the player receives an advance symbol in a previous group. Here, gaming device 10 preferably reveals the award or award and advance of the randomly selected selection in the subsequent group. In that way, the player knows what has happened when the player receives an advance symbol in the previous group. If the randomly selected symbol from the next group is likewise an advance symbol, gaming device 10 then randomly picks a selection from the next designated selection group. It should be appreciated that additional outcomes, such as awards, can be associated with the alignment of two or more advances.

In an alternative embodiment, the group which contains the advance, jackpot, target or best award or outcome can have just that outcome or have a plurality of selections with one or more selections having such outcomes. That enables the game designer to vary the odds of achieving such outcome in any desirable manner. That also enables the game to include more advances in the groups so that it is more likely that the player gets to the final group, which is more exciting for the player.

It should also be appreciated that in addition to or instead of the number of picks provided to the player, the selection game of the present invention can include one or more terminators associated with the selections, which function to end the game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of different selection groups;

(b) display a plurality of selections in each of said selection groups, wherein a first one of the selections in a first one of the selection groups is linked to a first one of the selections in a second one of the selection groups;

(c) associate a plurality of advances with the selections, wherein at least one selection of each of a plurality of the different selection groups is associated with one of said advances;

(d) associate at least one award with at least one of the selections of at least one of the selection groups;

(e) provide a player a number of picks of the selections from the selection groups;

(f) enable the player to pick one of the selections from the first selection group, said pick counting against the provided number of picks;

(g) if said picked selection is associated with one of the advances and said picked selection is linked to the first selection in the second selection group:

(i) automatically cause the pick of the first selection from the second selection group, (ii) said automatically caused pick not counting against the provided number of picks, and (iii) provide an advance award if another one of the advances is associated with said first selection automatically caused to be picked from the second selection group; and (h) indicate the at least one award if either:

(i) the player picks one of said selections associated with the at least one award, or (ii) one of the advances causes the pick of one of said selections associated with the at least one award.

2. The gaming device of claim 1, wherein if the player picks one of the selections associated with one of the advances, said pick of said selection associated with said advance counts against the provided number of picks and said automatically caused pick does not count against the provided number of picks.

3. The gaming device of claim 1, which includes a plurality of links between the plurality of selections of at least two of the selection groups.

4. The gaming device of claim 3, wherein when executed by the at least one processor, the plurality of instructions cause the at least one processor to operate with the at least one display device to display the selection groups in alignment, each of the selection groups being aligned to show the links between the selections of at least two of the selection groups.

5. The gaming device of claim 1, wherein when executed by the at least one processor, the plurality of instructions cause the at least one processor to associate a plurality of the advances with a plurality of the selections in at least one of the selection groups.

6. The gaming device of claim 1, wherein the selection groups are arranged in an order and a percentage of advances associated with the selections decreases for each subsequent selection group.

7. The gaming device of claim 1, which includes a plurality of awards, at least one of the awards associated with one of the selections of each of the selection groups, wherein when executed by the at least one processor, the plurality of instructions cause said at least one processor to indicate the award to be provided to the player if the player picks said selection or one of the advances causes the pick of said selection.

8. The gaming device of claim 1, which includes a plurality of awards associated with a plurality of the selections of one of the selection groups, wherein when executed by the at least one processor, the plurality of instructions cause the at least one processor to indicate each award associated with the selections picked by the player and the selections caused to be picked by the advance.

9. The gaming device of claim 1, which includes a plurality of awards, one of said awards associated with each of the selections of each of the selection groups, wherein when executed by the at least one processor, the plurality of instructions cause the at least one processor to indicate each award associated with the selections picked by the player and the selections caused to be picked by the advance.

10. The gaming device of claim 1, which includes a plurality of awards associated with a plurality of the selections of the selection groups, wherein when executed by the at least one processor, the plurality of instructions cause the at least one processor to indicate each award associated with the selections picked by the player and the selections caused to be picked by the advance.

11. The gaming device of claim 1, which includes a plurality of awards, wherein each selection is associated with at least one of: (i) one of the advances, and (ii) one of said awards, wherein when executed by the at least one processor, the plurality of instructions cause the at least one processor to indicate each award associated with the selections picked by the player and the selections caused to be picked by the advance.

12. The gaming device of claim 1, wherein when executed by the at least one processor, the plurality of instructions cause the at least one processor to reset the number of picks upon one of the selections having an associated advance being picked.

13. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of different selection groups;

(b) display a plurality of selections in each of said selection groups, wherein at least one in each of the selection groups is linked to at least one of the selections in another one of the selection groups;

(c) associate a plurality of advances with the selections, at least one selection of each of a plurality of the different selection groups being associated with one of said advances;

(d) provide a player a number of picks from the selection groups;

(e) enable the player to pick one of the selections from the selection groups, said pick counting against the provided number of picks;

(f) indicate an award to be provided to the player if:

(i) the player picks one of the selections associated with one of the advances from a first one of the selection groups, (ii) said picked selection from the first selection group is linked to one of the selections from a second one of the selection groups, (iii) said advance automatically causes the pick of the selection from the second selection group which is linked to said picked selection from the first selection group, the automatically caused pick not counting against the provided number of picks, (iv) another one of the advances is associated with said picked selection automatically caused to be picked from the second selection group, and (v) at least one pick of the provided number of picks is remaining.

14. The gaming device of claim 13, wherein if the player picks one of the selections associated with one of the advances, said pick of said selection associated with said advance counts against the provided number of picks and said automatically caused pick does not count against the provided number of picks.

15. The gaming device of claim 13, which includes a plurality of links between the plurality of selections of at least two of the selection groups.

16. The gaming device of claim 15, wherein when executed by the at least one processor, the plurality of instructions cause the at least one processor to operate with the at least one display device to display the selection groups in alignment to show the links between selections of at least two of the selection groups.

17. The gaming device of claim 13, wherein when executed by the at least one processor, the plurality of instructions cause the at least one processor to associate a plurality of the advances with a plurality of the selections in at least one of the selection groups.

18. The gaming device of claim 13, wherein when executed by the at least one processor, the plurality of instructions cause the at least one processor to operate with the at least one display device to display the selection groups arranged in an order and a percentage of advances associated with the selections decreases for each subsequent selection group.

19. The gaming device of claim 13, which includes at least one award associated with one of the selections of one of the groups, wherein when executed by the at least one processor, the plurality of instructions cause the at least one processor to indicate said award to be provided to the player if the player picks said selection or an advance causes the pick of said selection.

20. The gaming device of claim 13, which includes a plurality of awards associated with a plurality of the selections of one of the groups, wherein when executed by the at least one processor, the plurality of instructions cause the at least one processor to indicate each award associated with the selections picked by the player and the selections caused to be picked by the advance.

21. The gaming device of claim 13, which includes a plurality of awards, one of said awards associated with one of the selections of each of the groups, wherein when executed by the at least one processor, the plurality of instructions cause the at least one processor to indicate each award associated with the selections picked by the player and the selections caused to be picked by the advance.

22. The gaming device of claim 13, which includes a plurality of awards associated with a plurality of the selections of the groups, wherein when executed by the at least one processor, the plurality of instructions cause the at least one processor to indicate each award associated with the selections picked by the player and the selections caused to be picked by the advance.

23. The gaming device of claim 13, which includes a plurality of awards, wherein each selection not having an associated advance has one of said awards associated with said selection, wherein when executed by the at least one processor, the plurality of instructions cause the at least one processor to indicate each award associated with the selections picked by the player and the selections caused to be picked by the advance.

24. The gaming device of claim 13, wherein when executed by the at least one processor, the plurality of instructions cause the at least one processor to reset the provided number of picks upon one of the selections having an associated advance being picked.

25. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of selection groups;

(b) display a plurality of selections in each of said selection groups, wherein at least one of the selections in each of the selection groups is linked to one of the selections in a different one of the selection groups;

(c) associate a plurality of advances with the selections, wherein at least one selection of each of a plurality of the different selection groups is associated with one of said advances;

(d) provide a player a number of picks from the selection groups;

(e) enable the player to pick one of the selections from the selection groups;

(f) indicate an award to be provided to the player if for each of two picks by the player:

(i) the player picks one of the selections associated with one of the advances, said pick counting against the provided number of picks, (ii) said picked selection is linked to one of the selections from another one of the selection groups, (iii) said advance automatically causes the pick of the selection from the second selection group which is linked to said picked selection from the first selection group, the automatically caused pick not counting against the providing number of picks, and (iv) said picked selection automatically caused to be picked by the advance is associated with another one of the advances.

26. The gaming device of claim 25, wherein if the player picks one of the selections associated with one of the advances, said pick caused by said advance does not count against the provided number of picks.

27. The gaming device of claim 25, which includes a plurality of links between a plurality of the selections of at least two of the selection groups.

28. The gaming device of claim 27, wherein when executed by the at least one processor, the plurality of instructions cause the at least one processor to operate with the at least one display device to display the selection groups in alignment, each of the selection groups being aligned to show the links between the selections of at least two of the selection groups.

29. The gaming device of claim 25, wherein when executed by the at least one processor, the plurality of instructions cause the at least one processor to associate a plurality of the advances with a plurality of the selections in at least one of the selection groups.

30. The gaming device of claim 25, wherein when executed by the at least one processor, the plurality of instructions cause the at least one processor to operate with the at least one display device to display the selection groups arranged in an order such that a percentage of advances with the selections decreases for each subsequent selection group.

31. The gaming device of claim 25, which includes at least one award associated with one of the selections of one of the groups, wherein when executed by the at least one processor, the plurality of instructions cause said at least one processor to indicate the award to be provided to the player if the player picks said selection or an advance causes the pick of said selection.

32. The gaming device of claim 25, which includes a plurality of awards associated with a plurality of the selections of one of the groups, wherein when executed by the at least one processor, the plurality of instructions cause the at least one processor to indicate each award associated with the selections picked by the player and the selections caused to be picked by the advance.

33. The gaming device of claim 25, which includes a plurality of awards, one of said awards associated with one of the selections of each of the groups, wherein when executed by the at least one processor, the plurality of instructions cause the at least one processor to indicate the each award associated with the selections picked by the player and the selections caused to be picked by the advance.

34. The gaming device of claim 25, which includes a plurality of awards associated with a plurality of the selections of the groups, wherein when executed by the at least one processor, the plurality of instructions cause the at least one processor to indicate the each award associated with the selections picked by the player and the selections caused to be picked by the advance.

35. The gaming device of claim 25, which includes a plurality of awards, wherein each selection not having an associated advance has one of said awards associated with said selection, wherein when executed by the at least one processor, the plurality of instructions cause the at least one processor to indicate the each award associated with the selections picked by the player and the selections caused to be picked by the advance.

36. The gaming device of claim 25, wherein when executed by the at least one processor, the plurality of instructions cause the at least one processor to reset the provided number of picks upon a selection having an associated advance symbol being picked.

37. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of different selection groups;

(b) display a plurality of selections in each of said different selection groups;

(c) display a plurality of advances adapted to be associated with the selections, wherein at least one selection of each of a plurality of the different selection groups is associated with one of said advances;

(d) indicate a number of picks from the selection groups for a player, said indicated number of picks being usable to pick from the plurality of the different selection groups;

(e) indicate an advance award to be provided to the player if:

(i) the player picks one of the selections associated with a first one of the advances, said pick counting against the indicated number of picks, (ii) said first advance automatically causes the pick of one of the selections from a first different one of the selection groups which is linked to the picked selection, said automatically caused pick by the first advance not counting against the indicated number of picks, (iii) a second one of the advances is associated with said selection automatically caused to be picked by the first advance, and (iv) said second advance automatically causes the pick of one of the selections from a second different one of the selection groups which is linked to said selection automatically caused to be picked by the first advance or the advance award, said automatically caused pick by the second advance not counting against the indicated number of picks.

38. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of first selections;

(b) associate a first advance with one of the first selections;

(c) display a plurality of second selections, wherein at least one of the first selections is individually associated with one of the second selections;

(d) indicate a number of picks of the first and second selections, (e) enable a player to pick one of the first selections, (f) if the picked first selection is associated with the first advance, generate the first advance, (g) if the picked first selection is individually associated with one of the second selections, automatically cause the second selection to be picked, said automatically caused pick not counting against the indicated number of picks, and (h) if the picked second selection is associated with a second advance, cause an advance award to be provided to the player.

39. The gaming device of claims 38, which includes at least one award associated with one of the first selections.

40. The gaming device of claim 38, wherein when executed by the at least one processor, the plurality of instructions cause the at least one processor to operate with the at least one display device to display the first and second selections aligned to indicate the associations between the first selections and second selections.

41. A method of operating a gaming device including a plurality of instructions, said method comprising:

(a) causing at least one display device to display a plurality of different selection groups;

(b) providing a number of picks to a player, the provided number of picks being usable to pick from a plurality of selection groups, each of the selection groups including a plurality of selections;

(c) enabling the player to pick at least one selection from a first one of the selection groups (d) if the picked selection is not associated with a first advancement which advances the player through the first selection group (i) causing at least one processor to execute the plurality of instructions to count the pick against the provided number of picks, and (ii) enabling the player to pick from the first selection group until the picked selection is associated with the first advancement;

(e) if the picked selection is associated with the first advancement (i) causing at least one processor to execute the plurality of instructions to automatically cause a pick one of the selections from a second one of the selection groups, (ii) causing the at least one processor to execute the plurality of instructions to maintain the provided number of picks, such that the automatically caused pick does not count against the provided number of picks, and (iii) enabling the player to pick at least one selection from the second selection group until the picked selection from the second selection group is associated with a second advancement which advances the player through the second selection group;

(f) causing the at least one processor to execute the plurality of instructions to track a quantity of picks used by the player to advance through the first and second selection groups; and (g) causing an advance award to be provided to the player if the tracked quantity of picks for advancing through each of the first and second selection groups is less than or equal to the provided number of picks.

42. The method of claim 41, which includes providing a separate number of picks for the first and second selection groups.

43. The method of claim 41, which includes causing the at least one processor to execute the plurality of instructions to require at least one pick to be used to receive the advance award.

44. The method of claim 41, which includes, upon the picking of the first advancement, causing the at least one processor to execute the plurality of instructions to automatically reveal one of the selections in the second selection group, wherein the automatically revealed selection can yield the second advancement.

45. The method of claim 44, wherein the automatically revealed selection in the second selection group is related to the picked selection in the first group that yielded the first advancement.

46. The method of claim 44, wherein the automatically revealed selection in the second selection group is randomly chosen upon picking the first advancement.

47. The method of claim 41, which includes causing the at least one processor to execute the plurality of instructions to not count a pick in the second selection group that yields the second advancement if the pick is a result of the picked selection corresponding to the first advancement in the first selection group.

48. The method of claim 41, which includes providing steps (a) to (g) via a data network or a computer storage device.

49. The method of claim 48, wherein the data network includes an internet.

50. A method of operating a gaming device including a plurality of instructions, said method comprising:

(a) causing at least one display device to display a plurality of different selection groups, each one of the selection groups including a plurality of selections;

(b) providing a number of picks to a player, the provided number of picks being usable to pick from the plurality of different selection groups;

(c) enabling the player to pick from a first one of the selection groups;

(d) if the picked selection is not associated with a first advancement (i) causing at least one processor to execute the plurality of instructions to count the pick against the provided number of picks, and (ii) enabling the player to pick from the first selection group until the picked selection is associated with the first advancement;

(e) if the picked selection is associated with the first advancement, and the first advancement is not linked with a second advancement in a second one of the selection groups (i) causing the at least one processor to execute the plurality of instructions to count the pick against the provided number of picks, and (ii) enabling the player to pick from the second selection group until the player picks the second advancement (f) if the picked selection is associated with the first advancement, and the first advancement is linked with the second advancement in the second selection group (i) causing the at least one processor to execute the plurality of instructions to automatically cause the second advancement to be picked, and (ii) causing the at least one processor to execute the plurality of instructions to maintain the provided number of picks, such that the automatically caused pick of the second advancement does not count against the provided number of picks; and (g) providing an advance award to the player for advancing through the first and second selection groups within a designated number of the picks.

51. The method of claim 50, which includes, upon picking the first advancement, causing the at least one processor to execute the plurality of instructions to auctomatically reveal one of the selections in the second selection group, wherein the automatically revealed selection can yield the second advancement.

52. The method of claim 51, wherein the automatically revealed selection in the second selection group is related to the selection in the first selection group that yielded the first advancement.

53. The method of claim 51, wherein the automatically revealed selection in the second selection group is randomly indicated by the first advancement.

54. The method of claim 50, which includes providing steps (a) to (g) via a data network or a computer storage device.

55. The method of claim 54, wherein the data network includes an internet.

* * * * *

UNITED STATES PATENT AND TRADEMARK OFFICE
CERTIFICATE OF CORRECTION

PATENT NO. : 7,585,218 B2
APPLICATION NO. : 10/661036
DATED : September 8, 2009
INVENTOR(S) : Randall D. Mead et al.

It is certified that error appears in the above-identified patent and that said Letters Patent is hereby corrected as shown below:

IN THE CLAIMS:

In Claim 41, Column 21, Line 27, change “groups” to --groups;--.

In Claim 41, Column 21, Line 30, change “group” to --group:--.

In Claim 41, Column 21, Line 38, change “advancement” to --advancement:--.

In Claim 50, Column 22, Line 37, change “advancement” to --advancement:--.

In Claim 50, Column 22, Line 47, change “groups” to --groups:--.

In Claim 50, Column 22, Line 56, change “group” to --group:--.

Signed and Sealed this

Second Day of February, 2010

David J. Kappos

*Director of the United States Patent and Trademark Office*

UNITED STATES PATENT AND TRADEMARK OFFICE

CERTIFICATE OF CORRECTION

PATENT NO. : 7,585,218 B2
APPLICATION NO. : 10/661036
DATED : September 8, 2009
INVENTOR(S) : Mead et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Fourteenth Day of September, 2010

David J. Kappos

David J. Kappos
*Director of the United States Patent and Trademark Office*